United States Patent
Kanda et al.

(10) Patent No.: US 6,688,716 B2
(45) Date of Patent: Feb. 10, 2004

(54) INK JET RECORDING APPARATUS AND METHOD

(75) Inventors: Hidehiko Kanda, Kanagawa (JP); Jiro Moriyama, Kanagawa (JP); Yoshinori Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/995,703

(22) Filed: Nov. 29, 2001

(65) Prior Publication Data

US 2002/0063750 A1 May 30, 2002

(30) Foreign Application Priority Data

Nov. 30, 2000 (JP) ......................................... 2000-365331

(51) Int. Cl.[7] ............................ B41J 29/38; B41J 29/393
(52) U.S. Cl. ............................................. 347/16; 347/19
(58) Field of Search .............................. 347/16, 19, 12, 347/10, 11, 14, 23, 41, 15, 9, 40, 42, 43, 44; 358/298, 502

(56) References Cited

U.S. PATENT DOCUMENTS 5,614,931 A * 3/1997 Koike et al. ................. 347/43
6,086,185 A    7/2000 Inui et al. ................... 347/43
6,142,604 A   11/2000 Kanda et al. ................ 347/41
6,158,834 A * 12/2000 Kato et al. ................... 347/9
6,296,340 B1  10/2001 Tajika et al. ................ 347/12

FOREIGN PATENT DOCUMENTS

JP            6-135014           5/1994

* cited by examiner

*Primary Examiner*—Judy Nguyen
*Assistant Examiner*—Charles W. Stewart, Jr.
(74) *Attorney, Agent, or Firm*—Fitzpatrick, Cella, Harper & Scinto

(57) ABSTRACT

The present invention provides an ink jet recording apparatus capable of recording high-quality images in which not only color shading caused in the process of reciprocating recording is prevented, but also bleeding between colors inherent in a multi-pass recording method is reduced. The position of the top of ejection orifices in a second ejection orifice row for ejecting color ink is spaced a length away from a first ejection orifice row for ejecting black ink. The length is determined according to values m, n and such a condition that the value a makes (m+a) an even number. Under the circumstances, recording is performed by reciprocating scanning, which makes differences in recording time between colors equal to each other.

20 Claims, 28 Drawing Sheets

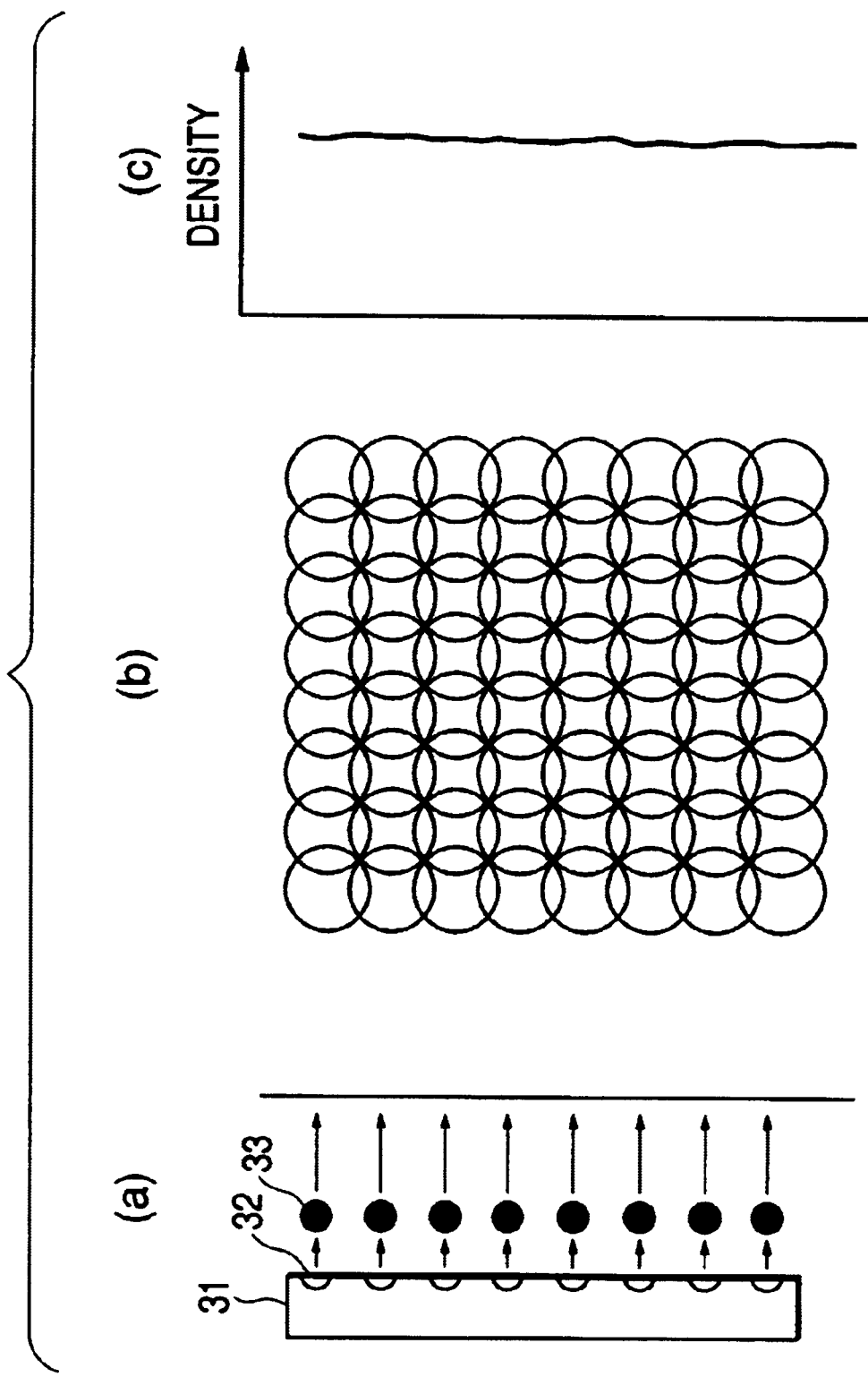

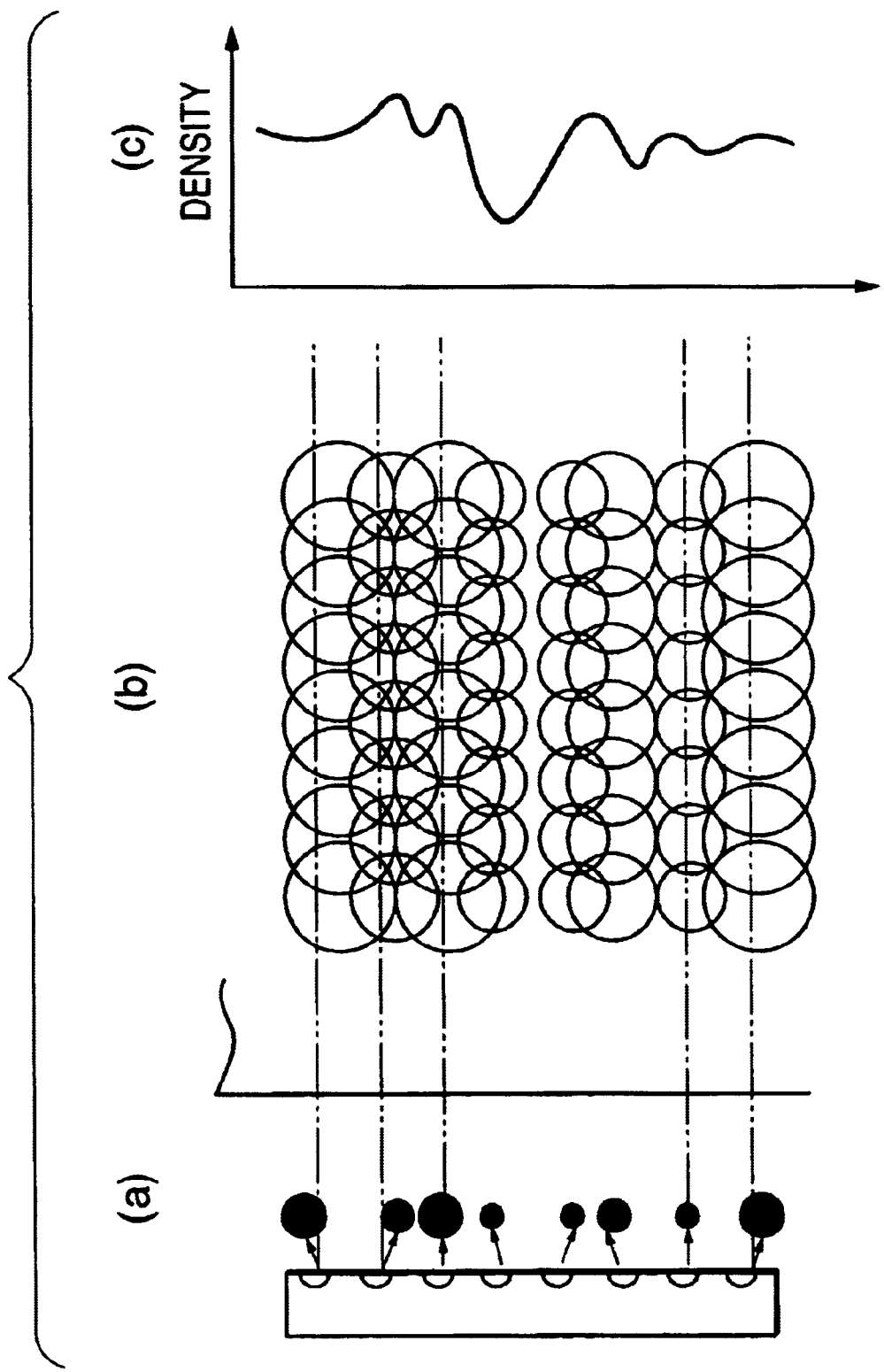

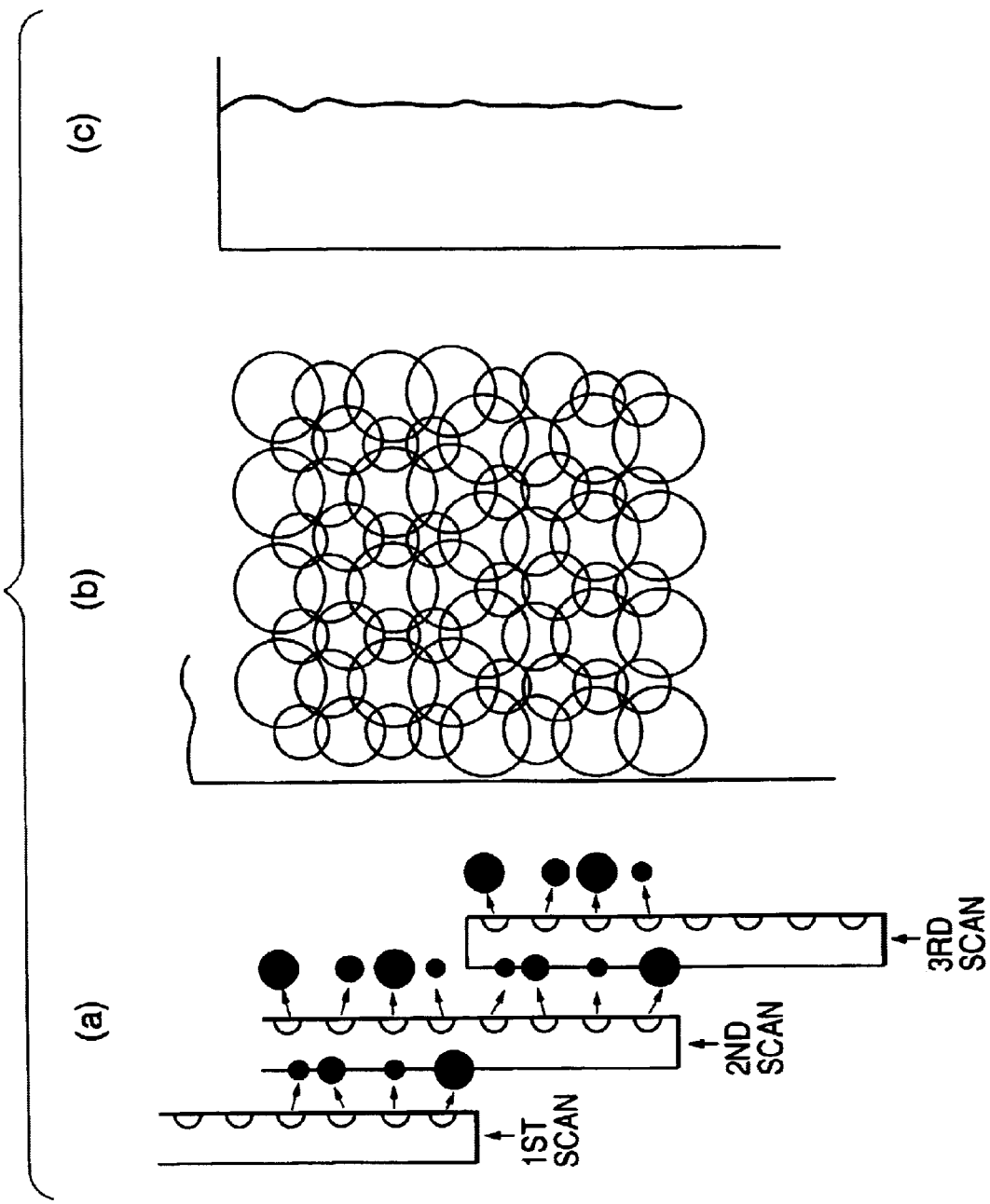

○ CHECKER FLAG PATTERN PRINT DOT

○ REVERSE CHECKER FLAG PATTERN PRINT DOT

FIG. 13

|  | IMAGE AREA A | IMAGE AREA B |
|---|---|---|
| TIME DIFFERENCE BETWEEN 1ST SCAN AND 2ND SCAN | T1=0.35 SEC | T2=0.15 SEC |
| TIME DIFFERENCE BETWEEN 2ND SCAN AND 3RD SCAN | T2=0.15 SEC | T1=0.35 SEC |
| TIME DIFFERENCE BETWEEN 3RD SCAN AND 4TH SCAN | T1=0.35 SEC | T2=0.15 SEC |

FIG. 17

|  | IMAGE AREA A | IMAGE AREA B |
|---|---|---|
| TIME DIFFERENCE BETWEEN 1ST SCAN AND 2ND SCAN | T1=0.35 SEC | T2=0.15 SEC |
| TIME DIFFERENCE BETWEEN 2ND SCAN AND 3RD SCAN | T2=0.15 SEC | T1=0.35 SEC |
| TIME DIFFERENCE BETWEEN 3RD SCAN AND 4TH SCAN | T1=0.35 SEC | T2=0.15 SEC |
| TIME DIFFERENCE BETWEEN 4TH SCAN AND 5TH SCAN | T2=0.15 SEC | T1=0.35 SEC |
| TIME DIFFERENCE BETWEEN 5TH SCAN AND 6TH SCAN | T1=0.35 SEC | T2=0.15 SEC |
| TIME DIFFERENCE BETWEEN 6TH SCAN AND 7TH SCAN | T2=0.15 SEC | T1=0.35 SEC |
| TIME DIFFERENCE BETWEEN 7TH SCAN AND 8TH SCAN | T1=0.35 SEC | T2=0.15 SEC |

FIG. 18

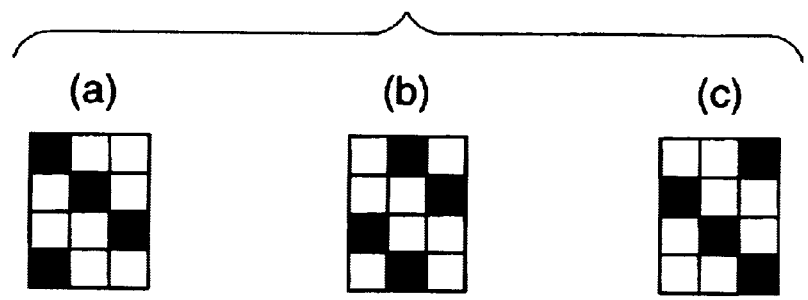

|  | IMAGE AREA A | IMAGE AREA B |
|---|---|---|
| TIME DIFFERENCE BETWEEN 1ST SCAN AND 2ND SCAN | T1=0.35 SEC | T2=0.15 SEC |
| TIME DIFFERENCE BETWEEN 2ND SCAN AND 3RD SCAN | T2=0.15 SEC | T1=0.35 SEC |
| TIME DIFFERENCE BETWEEN 3RD SCAN AND 4TH SCAN | T1=0.35 SEC | T2=0.15 SEC |
| TIME DIFFERENCE BETWEEN 4TH SCAN AND 5TH SCAN | T2=0.15 SEC | T1=0.35 SEC |
| TIME DIFFERENCE BETWEEN 5TH SCAN AND 6TH SCAN | T1=0.35 SEC | T2=0.15 SEC |

FIG. 27

|  | IMAGE AREA A | IMAGE AREA B |
|---|---|---|
| TIME DIFFERENCE BETWEEN 1ST SCAN AND 2ND SCAN | T1=0.35 SEC | T2=0.15 SEC |
| TIME DIFFERENCE BETWEEN 2ND SCAN AND 3RD SCAN | T2=0.15 SEC | T1=0.35 SEC |
| TIME DIFFERENCE BETWEEN 3RD SCAN AND 4TH SCAN | T1=0.35 SEC | T2=0.15 SEC |
| TIME DIFFERENCE BETWEEN 4TH SCAN AND 5TH SCAN | T2=0.15 SEC | T1=0.35 SEC |
| TIME DIFFERENCE BETWEEN 5TH SCAN AND 6TH SCAN | T1=0.35 SEC | T2=0.15 SEC |
| TIME DIFFERENCE BETWEEN 6TH SCAN AND 7TH SCAN | T2=0.15 SEC | T1=0.35 SEC |
| TIME DIFFERENCE BETWEEN 7TH SCAN AND 8TH SCAN | T1=0.35 SEC | T2=0.15 SEC |
| TIME DIFFERENCE BETWEEN 8TH SCAN AND 9TH SCAN | T2=0.15 SEC | T1=0.35 SEC |

INK JET RECORDING APPARATUS AND METHOD

BACKGROUND OF THE INVENTION

1. Field of the Invention

The present invention relates to an ink jet recording apparatus for performing recording by ejecting ink from recording means onto a recorded medium.

2. Description of the Related Art

There are recording apparatuses having recording capabilities, such as printers, copiers and facsimiles, or recording apparatuses for use as output equipments of composite-type electronic equipment and work station including computers and word processors. The above-mentioned recording apparatuses are to record images (including texts and the like) on recorded media, such as sheets of paper or plastic thin sheets, on the basis of image information (containing character information). The recording apparatuses may be classified by recording method into ink-jet type, wire dot-matrix type, thermal, recording type and laser-beam type. Of the types of recording apparatuses, the ink-jet type recording apparatuses (ink jet recording apparatuses) perform recording by ejecting ink from recording means (recording head(s)) onto recorded media, which are superior to the other types of recording apparatuses and enable high-resolution recording to be carried out quietly at high speed. In addition, the ink-jet type recording apparatuses are inexpensive, thus displaying excellent characteristics.

In recent years, with the growing need for apparatuses capable of printing finer (high-resolution) color images, many color ink-jet recording apparatuses capable of recording color images by ejecting a plurality of color inks have also been developed.

To improve recording speed, the above-mentioned ink jet recording apparatuses use a recording head constituted of a plurality of recording elements integrated therein, with a plurality of combinations of ink ejection orifices as ink ejection parts and liquid channels integrated therein. For color recording, plural recording heads configured such above are generally provided.

FIG. 1 shows a configuration of a printer part for carrying out printing on the surface of a recording medium using the above-mentioned recording head. Indicated with the reference numeral 101 in FIG. 1 are ink cartridges, each of which is composed of an ink tank and a recording head 102. Each ink tank is filled with one of four color inks, namely black, cyan, magenta or yellow ink. A row of plural orifices is formed on the recording head 102. FIG. 2 is a schematic diagram showing the plural ejection orifices aligned on the recording head 102 as viewed from the direction of an arrow Z in FIG. 1. Indicated with the reference numeral 201 in FIG. 2 are orifices aligned on the recording head 102.

In FIG. 1, the reference numeral 103 designates a convey roller. The convey roller 103 rotates in the direction of the arrow while holding a recording paper P in cooperation with an auxiliary roller 104. The rotation of the paper feed roller 103 in cooperation with that of the auxiliary roller 104 enables the recording paper P to be conveyed along the Y direction as a sub-scan direction from the upstream side to the downstream side. The reference numeral 105 designates feed rollers, which are operative not only to feed the recording paper P, but also to hold the same therebetween in the same manner as between the rollers 103 and 104. The reference numeral 106 designates a carriage for supporting and moving the four ink cartridges during printing. The carriage 106 is placed at a home position (h) indicated with a dotted line during standby or when the recording head needs recovering.

The carriage 106 located at the home position before printing is initiated to move along the direction indicated with an arrow X in FIG. 1 in response to input of print start instructions. As the carriage 106 moves, recording is performed by ejecting ink from the plural ejection orifices 201 formed on the ejection orifice surface of the recording head 102 on the basis of recording data. After completion of printing data up to the rear end of the line, the carriage 106 returns to the home position and starts moving again in the X direction to print data for the next line.

In the case of image printing, various factors such as color development, gradation and uniformity are required. Uniformity is critical to image printing, especially when slight variations in nozzles occur in the process of manufacturing recording heads. It is known that the slight variations in nozzles affect the ink ejection amount and direction of each nozzle to cause density irregularities and the like, resulting in a decline in the quality of a finally printed image.

Referring to FIGS. 3 and 4, a specific example of such a decline in the quality of an image will be described. Schematically shown at (a) of FIG. 3 with the reference numeral 31 is a recording head in which a row of eight nozzles 32 is provided. The reference numeral 33 designates ink droplets (hereinbelow referred to as ink droplets or simply as the ink) ejected from the nozzles 32. Shown at (b) of FIG. 3 is an example of an image formed by ejecting the ink periodically from the row of the nozzles of the recording head 31. As shown, eight dots are recorded by ejecting the ink from each of the nozzles while moving the recording head. Further, (c) of FIG. 3 is a graph showing optical density of the image shown at (b) of FIG. 3, choosing density as the abscissa.

It is ideal that the same amount of ink droplets is ejected from the recording head 31 in the same direction as shown at (a) of FIG. 3. If such ideal ejection is attained, the same sized dots will be hit on the paper surface as shown at (b) of FIG. 3, thus obtaining a uniform image without any density irregularity as a whole as shown at (c) of FIG. 3.

However, if variations in nozzles occur as discussed above and printing is performed as shown in FIG. 3 without any compensation for the variations, the size and direction of the ink droplets ejected from the nozzles will vary to cause density irregularities.

FIG. 4 is a schematic diagram for explaining the density irregularities caused when the variations in nozzles occur in the recording head. In FIG. 4, (a), (b) and (c) correspond to (a), (b) and (c) of FIG. 3, respectively. In other words, FIGS. 3 and 4 show a comparison between ideal recording and an actual state in which recording is performed with nozzles varying from one another.

Shown at (a) of FIG. 4 is a state in which variations occurs in the recording head and hence in the size and direction of ink droplets ejected from the nozzles of the recording head. As shown at (a) of FIG. 4, if the size and direction of ink droplets ejected from the respective nozzles vary, the ink droplets may be hit on the paper surface as shown at (b) of FIG. 4. This cause indicates the existence of blank parts that do not meet 100 percent of the area factors periodically, or excess dots overlapped one upon another to the contrary, or the occurrence of a white streak as shown in the center. The group of dots hit in this state shows a density distribution as shown at (c) of FIG. 4 in the direction in which the nozzles are aligned, resulting in such a phenomenon that it is perceptible to the human eye as density irregularities. Variations in paper feed amount may also make the streak conspicuous.

To take measures against the above-mentioned density irregularities, Japanese Patent Laid-open No. 06-143618 discloses a method of reducing the density irregularities. Referring to FIG. 5, the method will be described below in brief.

The recording operation as shown in FIG. 5 is completed by performing scanning of the recording head 31 three times for a recording area as shown at (b) of FIG. 3 or 4. Shown at (a) of FIG. 5 with the reference numbers 31a, 31b and 31c are relative positions of the recording head 31 at the fist, second and third scans, respectively. In this recording operation, the recording head 31 and the recording paper are moved relative to each other along a sub-scan direction (the arrangement or alignment direction of the nozzles of the recording head in this drawing) each time the recording head is scanned. In this case, the amount of relative movement corresponds to that of half of the eight nozzles provided in the recording head 31.

According to the method, the recording operation shown in FIG. 5 is performed by performing scanning of the recording head 31 three times for the print area shown at (b) of FIG. 3 or 4. However, half of the print area, that is, the area corresponding to four nozzles is completed at two scans of the recording head (hereinbelow, referred to as a two-pass scan operation of the recording head). In this case, the eight nozzles of the recording head are divided into two groups, namely the upper four nozzles and the lower four nozzles. Dots to be printed by respective nozzles at one main scan represent data obtained by thinning out prescribed image data by about half according to a predetermined image data pattern. Then dots are embedded in the remaining half of the image data at the second main scan to complete a printed output for the four-pixel area. Such a recording method is referred to as a multi-pass recording method below. It should be noted that since the recording method shown in FIG. 5 is to complete a printed output for a predetermined area at two scans, it is also referred to as a two-pass recording method.

Such a recording method can reduce by half the influence of a peculiarity of each nozzle on a printed image even if the recording head used is the same as that shown in FIG. 4. As a result, the printed image comes out well as shown at (b) of FIG. 5 with less black or white streaks that became noticeable in the image shown at (b) of FIG. 4. Consequently, density irregularities can be considerably reduced as shown at (c) of FIG. 5, compared to those in FIG. 4. Upon performing this recording operation, the image data is divided according to a predetermined image data pattern so that both image data obtained at the first and second main scans will be complementary to each other. As shown in FIGS. 6A, 6B and 6C, the image data pattern most commonly takes the form of a zigzag or checker flag pattern in which image data dot the matrix every other unit of pixels. Therefore, in a unit print area (in units of four pixels in this case), printed outputs are completed by the first main-scan at which a checker flag pattern is printed and the second main scan at which a reverse checker flag pattern (reverse pattern to that of the first main scan) is printed. FIGS. 6A, 6B and 6C describe how the thinning-out checker flag and reverse checker flag patterns are used to perform recording for a fixed area. In FIG. 6, the reference numerals 31a, 31b and 31c also indicate relative positions of the recording head 31 at the first, second and third scans, respectively.

As shown in FIG. 6A, the lower four nozzles are used to record the thinning-out checker flag pattern at the first main scan. Then, at the second main scan, an amount of paper feed corresponding to four pixels (one-half the head length) is performed to record the thinning-out reverse checker flag pattern (FIG. 6B). Further, at third main scan, the same amount of paper feed corresponding to four pixels (one-half the head length) is performed to record the thinning-out checker flag pattern again (FIG. 6C). Thus the thinning-out checker flag and reverse checker flag patterns are alternately recorded while feeding the paper by four pixels at each scan, thus completing recording for the recording area in units of four pixels at each main scan.

As discussed above, an image is completed using two different kinds of groups of nozzles in the same area, which makes it possible to obtain a high-quality image without any density irregularity.

On the other hand, Japanese Patent Laid-open No. 06-135014 discloses a technique for recording high-quality images in which bleeding of ink is prevented at the border part of black and color images. The following describes this method in brief. When a black image to be printed with a black ink is contiguous to a color image to be printed with a color ink, only predetermined ejection part of the ejection group for black ink is used so that scanning (in the X direction) to form the black image and scanning (in the X direction) to form the color image will not be performed continuously, thereby achieving high-quality images in which bleeding of ink is prevented at the border part of the black and color images.

Japanese Patent Laid-open No. 06-135014, however, fails to make reference to reciprocating recording for performing recording when the recording head is scanned both in its going or forward direction and its returning or backward direction.

In studying color shading (or lack of uniformity in color) in the reciprocating recording operation using the above-mentioned multi-pass recording method, the following phenomenon was confirmed. Suppose that ink is ejected from at least two different kinds of ejection orifice rows to complete image formation on respective image areas. In this case, some color shading was found in overlapped part of the first image area to be completed by the first ejection orifice row and the second image area to be completed by the second ejection orifice row. In other words, the color shading was developed between image areas in the overlapped part, the image areas differing from each other in the time it took to perform reciprocating recording. The first image area completed by the first ejection orifice row varies with time in penetrating and fixing states to the recording medium. Therefore, if the ink ejected from the second ejection orifice row is overlapped on or contiguous to the first image area, the above-mentioned phenomenon may occur depending on how long it takes to be overlapped on or contiguous to the first image area. In other words, variations in penetrating and fixing states to the recording medium between both inks overlapped or contiguous with each other can cause the color shading.

Japanese Patent Laid-open No. 06-135014 also fails to make reference to the above-mentioned multi-pass recording method. In studying bleeding between colors in the process of multi-pass recording as well, it was found that the multi-pass recording method showed characteristics different from the one-pass recording method. In addition to the difference in bleeding, recording using the multi-pass recording method differed from recording using the one-pass recording method in the phenomenon that the recorded portion on the recording medium was made bleachedlooking due to crowded droplets of plural color inks hit on the recording medium. The differences in these phenomena between the multi-pass recording method and the one-pass recording method are made due to the fact that the multi-pass recording method has not only the effect of preventing density irregularities, but also the effect of reducing the number of dots to be recorded per unit time, which makes different from the one-pass recording method in penetrating and fixing state to the recording medium.

SUMMARY OF THE INVENTION

The present invention has been made in view of the above-mentioned problems, and it is an object thereof to provide an ink jet recording apparatus capable of recording high-quality images in which not only color shading caused in the reciprocating recording operation is prevented, but also bleeding between colors inherent in multi-pass recording is reduced.

In attaining the above-mentioned object and according to the present invention, there is provided an ink jet recording apparatus or method for recording images on a recording medium. The ink jet recording apparatus includes scanning means using recording means having a first ejection orifice row and a second ejection orifice row, each of which has a plurality of ejection orifices aligned thereon for ejecting each ink. The scanning means moves the recording means relative to the recording medium to perform reciprocating recording along a main scan direction different from the direction in which the ejection orifices are aligned. The ink jet recording apparatus also includes sub-scanning means for sub-scanning the recording medium along a sub-scan direction from the upstream side to the downstream side. In this configuration, recording performed by ejecting ink from the recording means while the main scanning means is scanning the recording means, and sub-scanning performed by the sub-scanning means are repeated to record images on the recording medium. The above-mentioned ink jet recording apparatus or method features that when the number of times of record scans in the main scan direction to make the first ejection orifice row complete image formation is set to m (where m is a positive integer), the number of times of record scans in the main scan direction to make the second ejection orifice row complete image formation is set to n (where n is a positive integer), and the amount of sub-scanning of the recording medium performed by the sub-scanning means every main scan is set to L (where L is a positive number), the position of the top of the ejection orifices in the second ejection orifice row, to be used from the upstream side of the sub-scan direction is spaced a length of (m+a)×L apart from the first ejection orifice row to the downstream side of the sub-scan direction, and the value of a is controlled to make (m+a) an even number.

In another aspect of the present invention, the ink jet recording apparatus or method features that when the number of times of record scans in the main scan direction to make the first ejection orifice row complete image formation is set to m (where m is a positive integer), the number of times of record scans in the main scan direction to make the second ejection orifice row complete image formation is set to n (where n is a positive integer), and the amount of conveyance of the recording medium performed in the sub-scan direction every main scan is set to L (where L is a positive number), the position of the top of the ejection orifices in the second ejection orifice row, to be used from the downstream side of the sub-scan direction is spaced a length of (m+a)×L apart from the first ejection orifice row in the sub-scan direction, and the value of a is controlled to make (n+a) an even number.

In still another aspect of the present invention, the ink jet recording apparatus or method features that when the number of times of record scans in the main scan direction to make the first ejection orifice row complete image formation is set to m (where m is a positive integer), and the number of times of record scans in the main scan direction to make the second ejection orifice row complete image formation is set to n (where n is a positive integer), at least two kinds of amounts of sub-scanning of the recording medium performed in the sub-scan direction every main scan are used to determine, relative to the first ejection orifice row, the position of the top of the ejection orifices in the second ejection orifice row to be used from the upstream side of the sub-scanning performed by the sub-scanning means, wherein the position is equivalent to either of at least two kinds of total amounts of conveyance of the recording medium continuously performed (m+a) times using the at least two kinds of amounts of sub-scanning, and the value of a is controlled to make (m+a) an even number.

In yet another aspect of the present invention, the ink jet apparatus or method features that when the number of times of record scans in the main scan direction to make the first ejection orifice row complete image formation is set to m (where m is a positive integer), and the number of times of record scans in the main scan direction to make the second ejection orifice row complete image formation is set to n (where n is a positive integer), at least two kinds of amounts of sub-scanning performed by the sub-scan means every main scan are used to determine, relative to the first ejection orifice row, the position of the top of the ejection orifices in the second ejection orifice row to be used from the downstream side of the sub-scanning, wherein the position is equivalent to at least two kinds of total amounts of sub-scanning performed continuously (m+a) times (where a is a positive integer) using the at least two kinds of amount of sub-scanning, and the value of a is controlled to make (n+a) an even number.

BRIEF DESCRIPTION OF THE DRAWINGS

FIG. 3 is a view explaining an ideal print state in the ink jet recording apparatus;

FIG. 4 is a view explaining such an actual print state that density irregularities occur in the ink jet recording apparatus;

FIG. 5 is a view explaining how to reduce the density irregularities caused by a multi-pass recording method as practiced in an embodiment of the present invention;

FIG. 13 is a table showing time differences in recording area between scans according to the first embodiment of the present invention;

FIG. 17 is a table showing time differences in recording area between scans according to the second embodiment of the present invention;

FIG. 18 is a schematic view showing thinning-out patterns according to the second embodiment of the present invention;

FIG. 27 is a table showing time differences in recording area between scans according to the fourth embodiment of the present invention;

DESCRIPTION OF THE PREFERRED EMBODIMENTS

Hereinbelow, embodiments of the present invention will be described with reference to the accompanying drawings.

Figure 1:
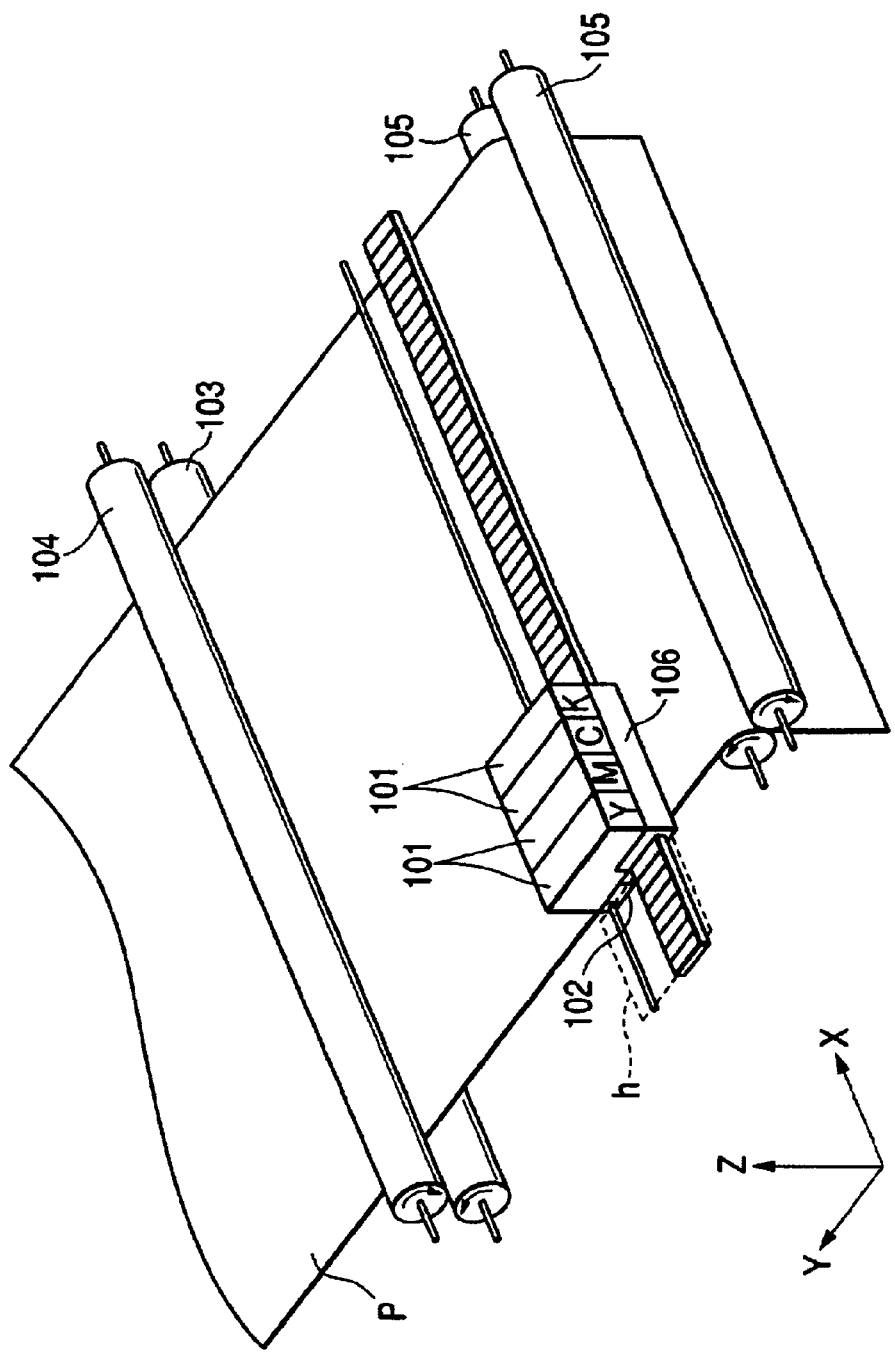
FIG. 1 is a schematic view explaining an ink jet recording apparatus to which the present invention is applicable.
Figure 2:
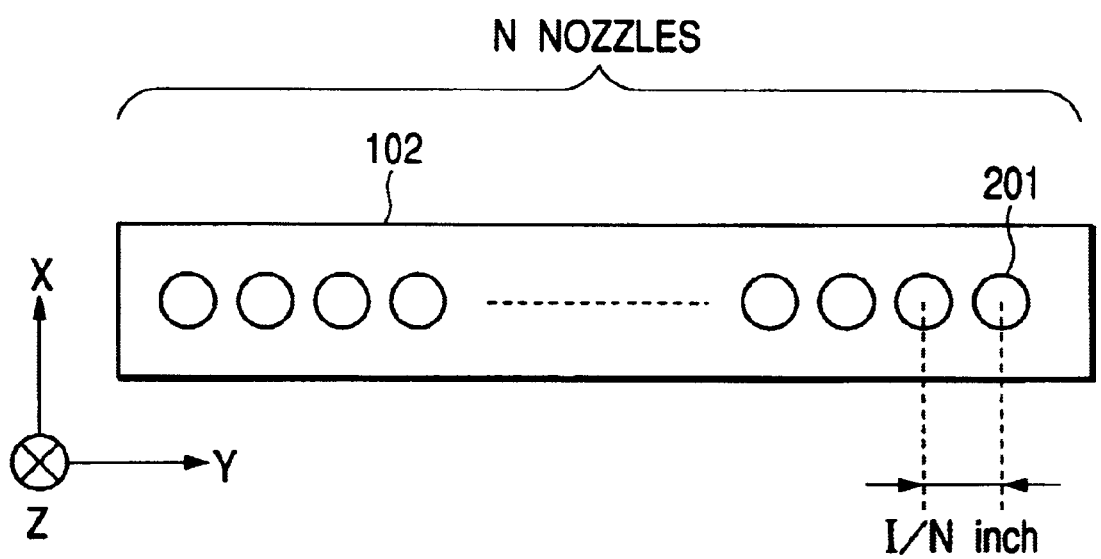
FIG. 2 is a schematic view showing a row of nozzles in a recording head to which the present invention is applicable.
Figure 6A:
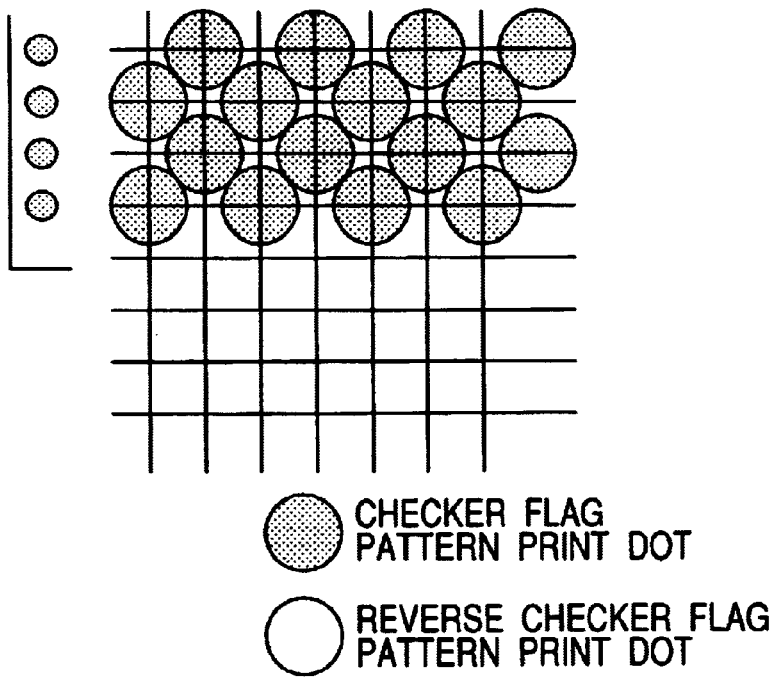
FIGS. 6A, 6B and 6C are views explaining another example of how to reduce the density irregularities caused by the multi-pass recording method as practiced in the embodiment of the present invention.
Figure 6B:
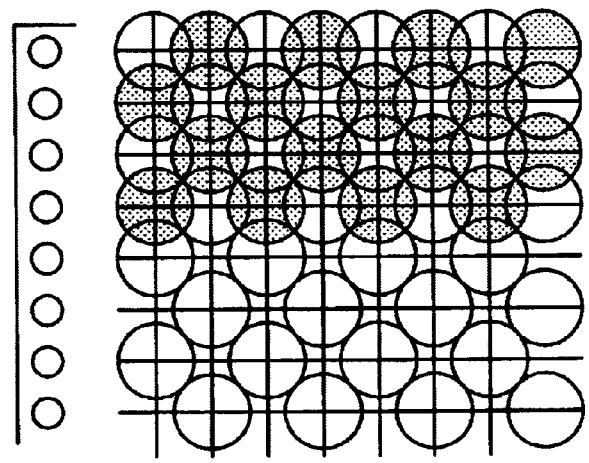
Figure 6C:
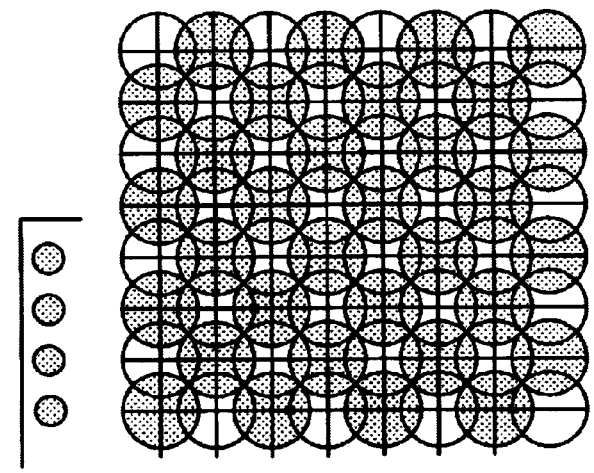
Figure 7:
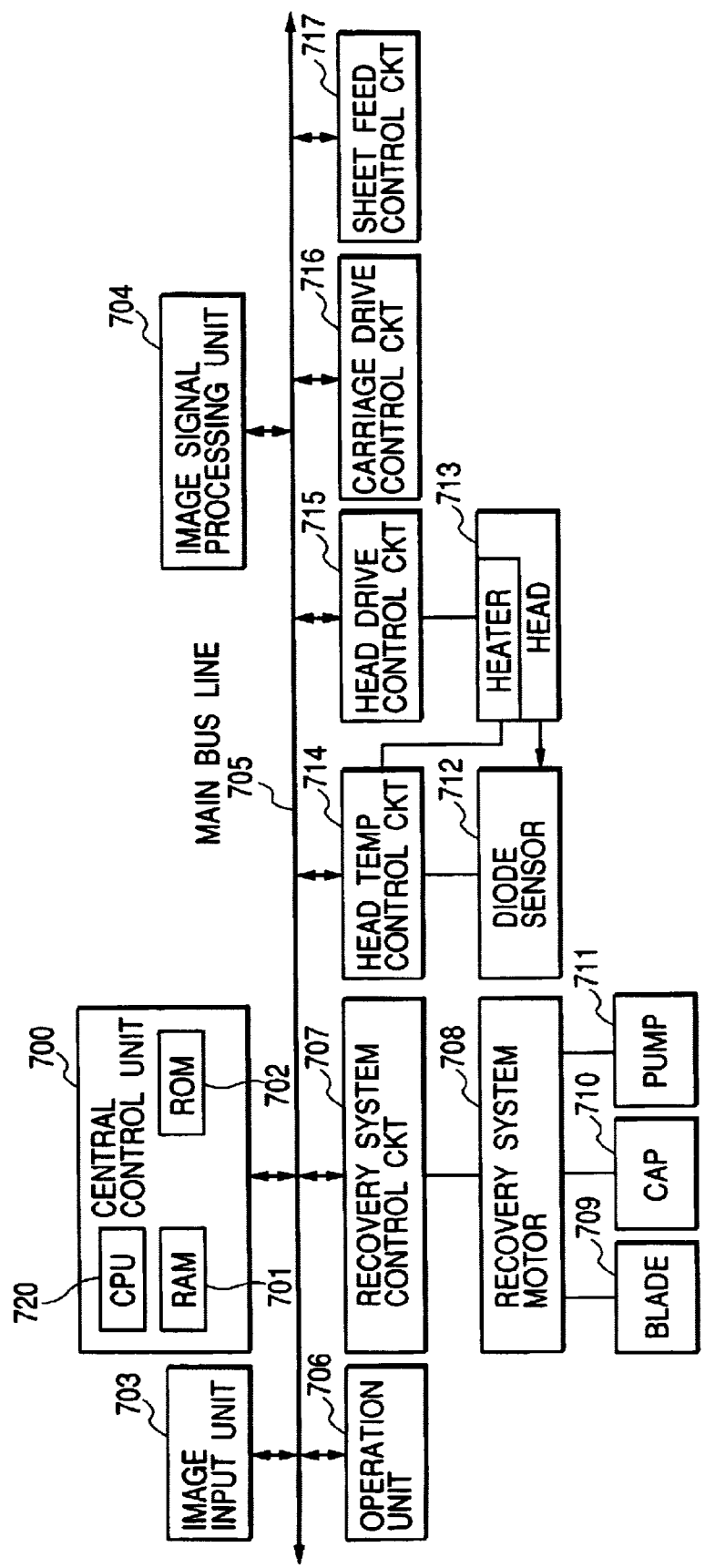
FIG. 7 is a block diagram showing a control configuration of an ink jet recording apparatus to which the present invention is applicable.

FIG. 7 is a block diagram showing a control configuration of an ink jet recording apparatus according to an embodiment of the present invention. It should be noted that the mechanical structure thereof is the same as that of the ink jet recording apparatus shown in FIG. 1. In other words, the ink jet recording apparatus according to the embodiment of the present invention is a serial type recording apparatus for performing recording by scanning the recording head along a main scan direction.

In FIG. 7, the ink jet recording apparatus is broadly divided into software processing means and hardware processing means. The software processing means includes an image input unit 703 for accessing a main bus line 705 whenever necessary, an image processing unit 704 responsive to the access and a central control unit 700. The hardware processing means includes an operation unit 706, a recovery system control circuit 707, an ink jet head temperature control circuit 714, a head drive control circuit 715, a carriage drive control circuit 716 for controlling a carriage in the main scan direction, and a sheet feed control circuit 717 for controlling feeding of a sheet in the sub-scan direction.

The central control unit 700 shown in FIG. 7 normally includes a ROM 701 and a random access memory (RAM) 702, both of which are controlled by a CPU 720 and given the optimum recording conditions for input information to perform recording by driving a recording head 713. Prestored in the RAM 702 is a program for executing a head recovery timing chart, which gives recovery conditions such as preliminary ejection conditions as required to the recovery system control circuit 707, the recording head, a heater for heat insulation and the like. A recovery system motor 708 drives not only the above-mentioned recording head 713, but also a cleaning blade 709, a cap 710 and a suction pump 911, all of which are spaced opposite to the recording head 713.

The recording head 713 is an ink jet type recording head (hereinbelow referred to as the ink jet head as well) for ejecting ink. In the embodiment, the recording head 713 is equipped with an electrothermal transducer as ejection means for ejecting ink. The electrothermal transducer applies thermal energy to ink so that a bubble will be formed in the ink by the application of the thermal energy, thereby ejecting the ink from each ejection orifice of the recording head 713. Such a type of recording head is also called a bubble jet recording head. In the embodiment, a heater is employed as the electrothermal transducer.

The head drive control circuit 715 executes drive conditions for the ink ejecting electrothermal transducer of the recording head 713, that is, it controls the recording head 713 to perform normal preliminary ejection or ink ejection for recording.

On the other hand, the heater for heat insulation is provided on a substrate on which the ink ejection electrothermal transducer of the recording head 713 is provided. The heater is designed to adjust the rate of heating so as to keep the temperature of the ink in the recording head at a desired set temperature. A diode sensor 712 is also provided on the substrate for measuring an actual temperature of the ink in the recording head. It should be noted that the diode sensor 712 may be provided outside, rather than on the substrate, or it may be located in the neighborhood or vicinity of the recording head.

The recording operation according to the present invention is such that recording performed while scanning the recording head in the main scan direction, and conveyance (sub-scanning) of the recording medium in the sub-scan direction are repeated to perform image formation on the recording medium. The repeated operations can be controlled by the above-mentioned central control unit 700.

Specific recording heads (hereinbelow referred to as recording means as well) used in the following embodiments are also equipped with an electrothermal transducer, respectively, for applying thermal energy to ink so that a bubble will be formed in the ink, thereby ejecting the ink from each ejection orifice. It should be noted that the present invention is not limited to these recording heads, and it is also applicable to a system for ejecting the ink using a piezo-electric element.

The following illustrates several embodiments based on the above-mentioned apparatus configuration to describe the present invention.

(First Embodiment)

Figure 8:
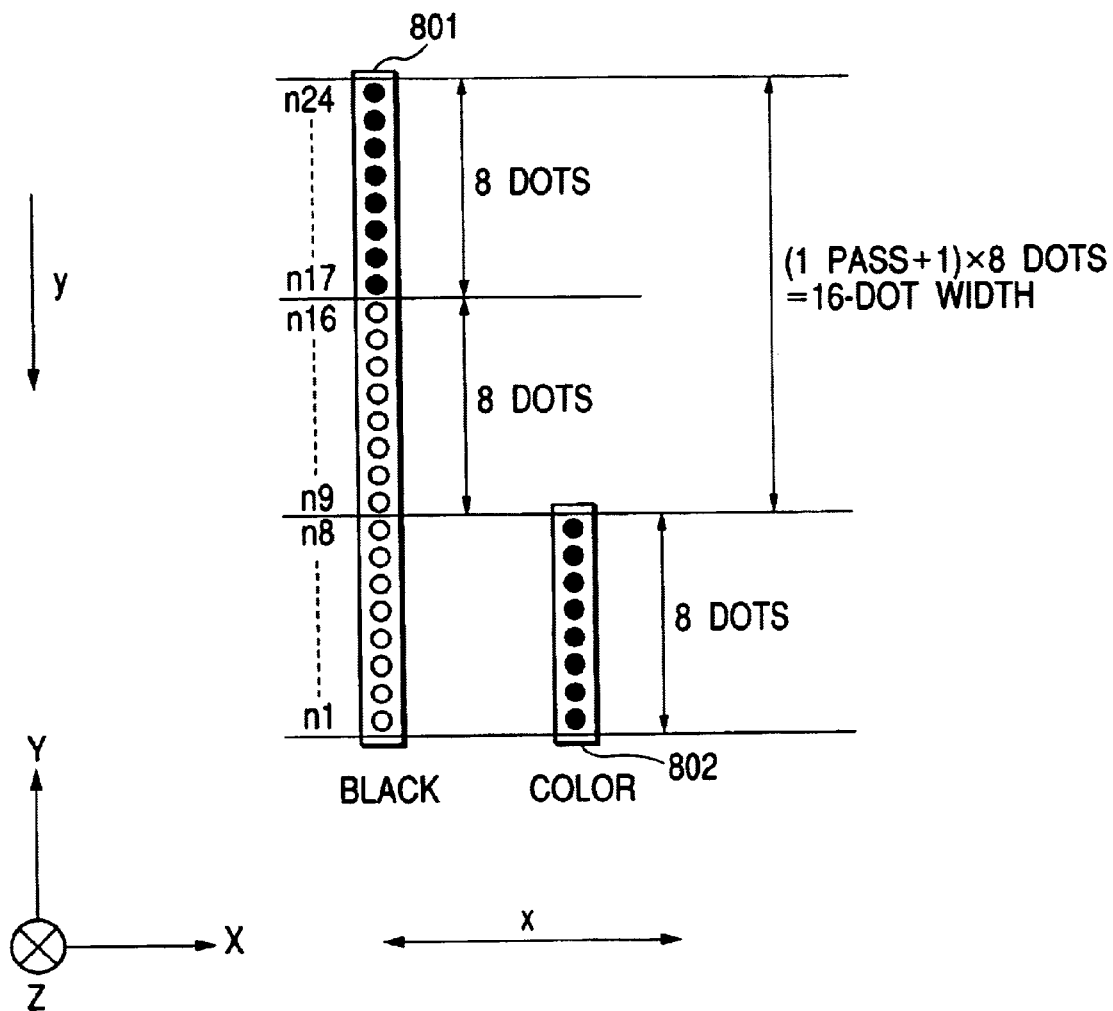
FIG. 8 is a view showing another configuration of recording heads according to a first embodiment of the present invention.

FIG. 8 is a schematic diagram showing recording heads according to the first embodiment of the present invention.

As shown in FIG. 8, a first recording head 801 has 24 ejection orifices (24 nozzles), where the number of ejection orifices n=24, at a density of 600 dots per inch (600 dpi), where the number of ejection orifices N per inch=600. On the other hand, a second recording head 802 has eight ejection orifices (eight nozzles), where the number of ejection orifices n=8, at the density of 600 dots per inch (600 dpi), where the number of ejection orifices N per inch=600.

In FIG. 8 and the embodiment to be described below, only one recording head for color ink is shown, but two or more recording heads for color ink may be mounted in the direction of an arrow x, depending on the number of color inks to be used for recording. The present invention is applicable to any common ink jet recording apparatus for performing recording by ejecting four color inks, namely black, yellow, magenta and cyan inks. If the present invention is applied to such an ink jet recording apparatus, three second recording heads 802 will be provided in the x direction in FIG. 8. Further, if plural kinds of color inks different in density are used, a plurality of recording heads corresponding to the number of kinds of color inks may be mounted.

In FIG. 8, circles in each head designate ejection orifices. Of all the circles, black circles represent ejection orifices to be used for recording control according to the embodiment, while white circles represent the other ejection orifices that are not used in the recording operation. In the recording method according to the first embodiment of the present invention, eight ejection orifices n17 to n24 are used for ejecting a black ink from in the first recording head 801 for black ink. On the other hand, all the eight ejection orifices n1 to n8 are used in the second recording head 802 for color ink. With the positional relation between the recording heads, all the ejection orifices (nozzles) are aligned according to the ejection orifice numbers in the direction of an arrow y. On the other hand, the row or ejection orifices of the second recording head is placed with a predetermined space from that of the first recording head in the main scan direction indicated with the arrow x. The arrow y represents the direction along the arrow Y (identical to the directional arrow Y in FIG. 1) shown in the lower left part of FIG. 8. Similarly, the arrow x represents the direction along the arrow X shown in the lower left part of FIG. 8.

Figure 9:
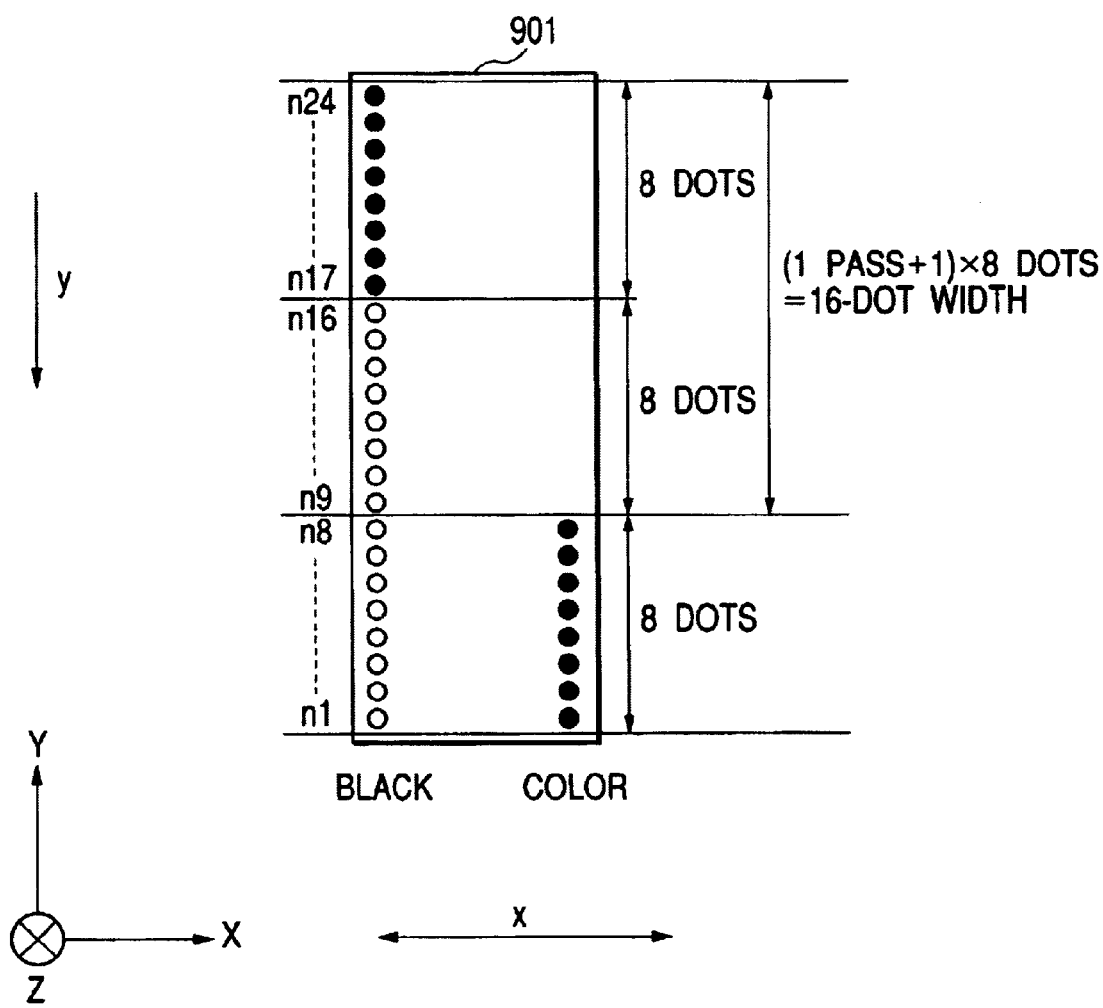
FIG. 9 is a schematic view explaining a configuration of a recording head to which the present invention is applicable.

The recording head 801 for ejecting the black ink and the recording head 802 for ejecting the color ink shown in FIG. 8 may be combined into a single recording head 901 as shown in FIG. 9.

Figure 10:
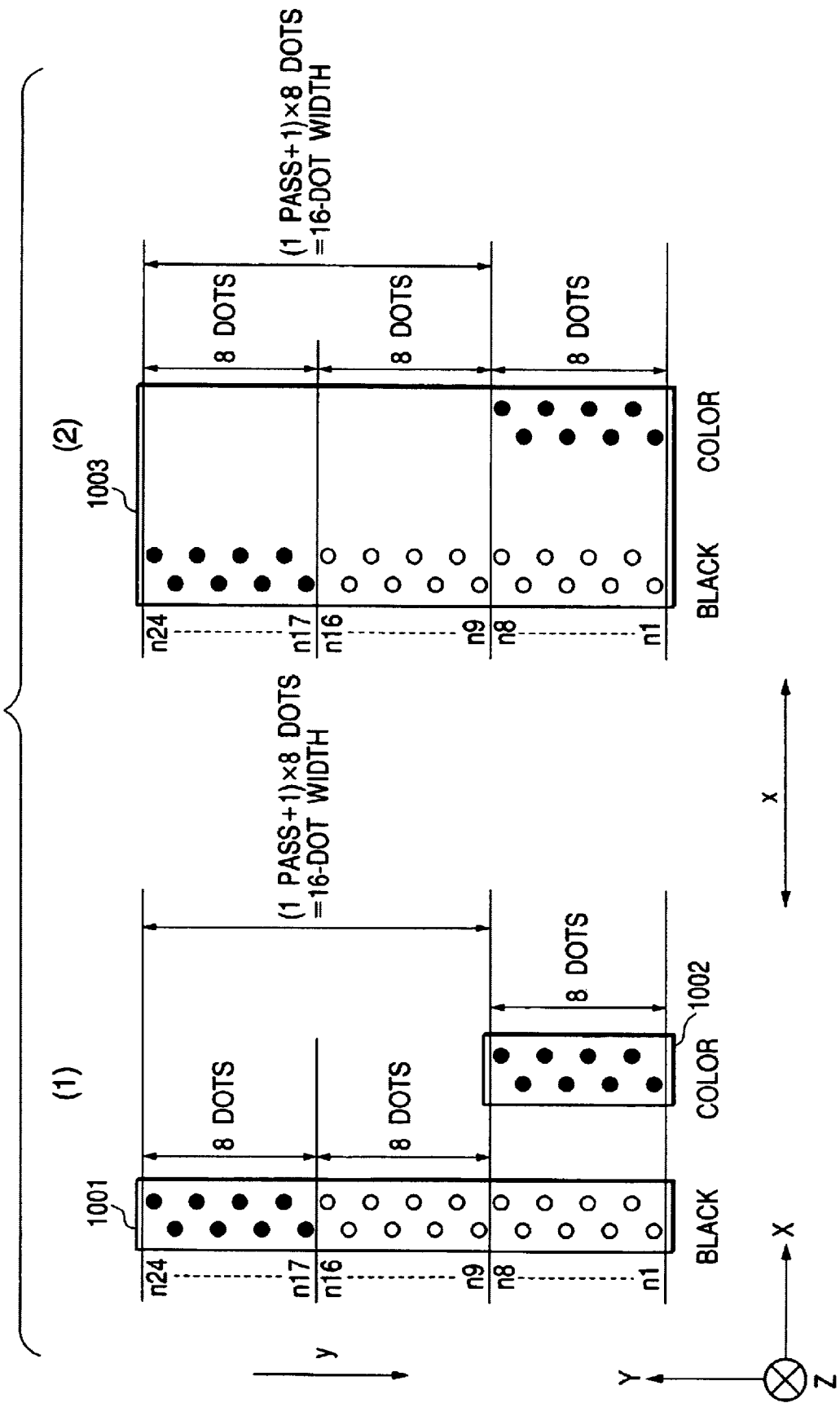
FIG. 10 is a view explaining such a configuration that ejection orifices are arranged in a zigzag or checker flag pattern as a configuration of a recording head to which the present invention is applicable.

Further, as shown at (1) and (2) of FIG. 10, the ejection orifices are not necessarily aligned in one row, and they may be arranged in two or more rows. Recording heads 1001 and 1002 shown at (1) of FIG. 10, and a recording head 1003 shown at (2) of FIG. 10 have two rows of ejection orifices, respectively. In this case, each row of ejection orifices (hereinbelow referred to as ejection orifice group as well) corresponds to either even- or odd-numbered ejection orifices, with the even-numbered ejection orifices and the odd-numbered ejection orifices arranged in a zigzag manner (or in a checker flag pattern). In the configuration shown at (1) of FIG. 10, the recording head 1001 for black ink and the recording head 1002 for color ink are provided as independent units so that they can be separated from each other. On the other hand, the recording head 1003 shown at (2) of FIG. 10 is a single recording head on which the ejection orifice row for black ink and the ejection orifice row for color ink are formed together.

Figure 11:
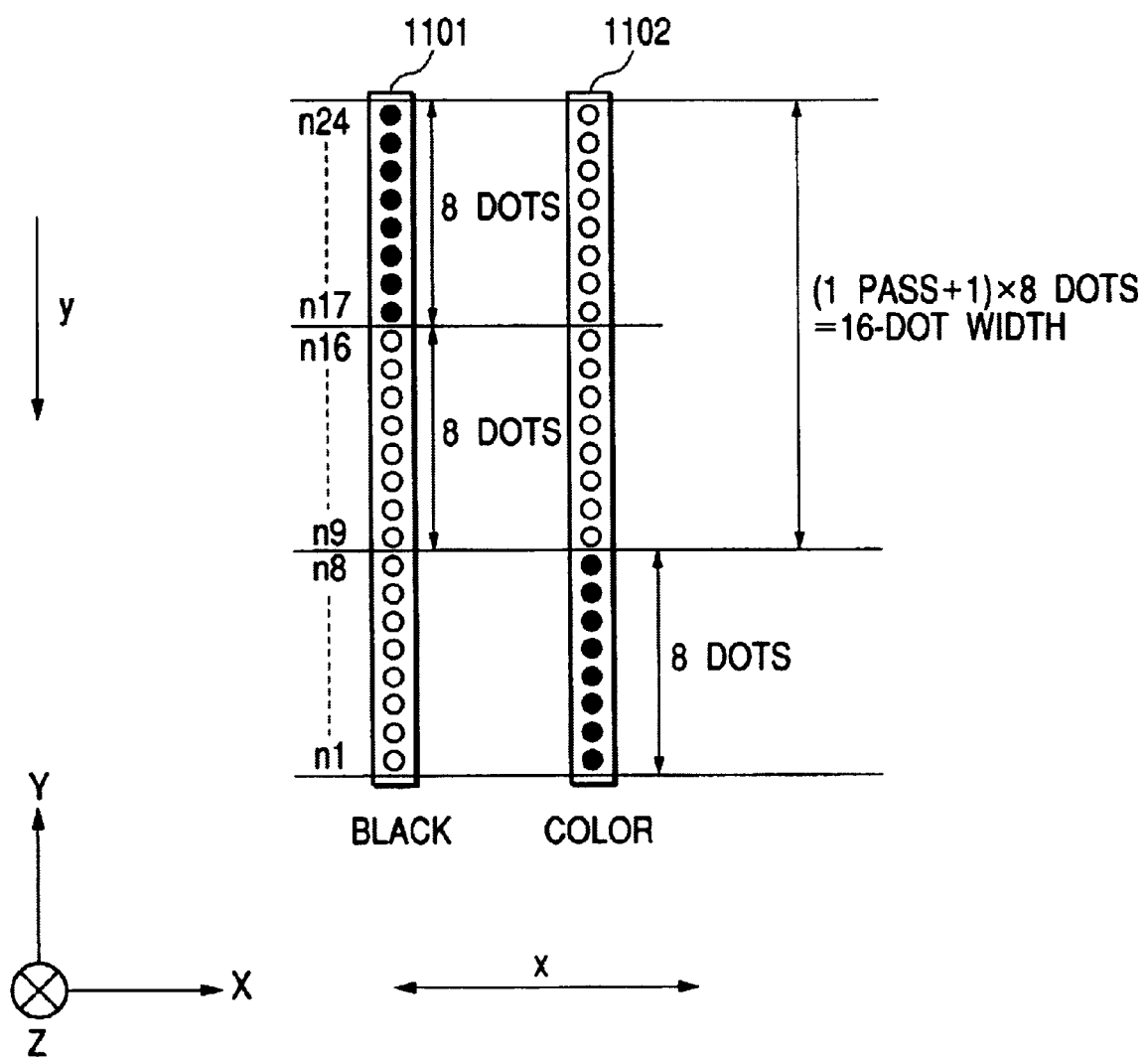
FIG. 11 is a view showing a configuration of recording heads applicable to first embodiment of the present invention.

FIG. 11 shows a case where a second recording head 1102 for ejecting a color ink has the same number of ejection orifices as that of a first recording head 1101 for black ink. In this case, eight ejection orifices n1 to n8 may be used for ejecting the color ink from the second recording head 1102.

It should be noted that the contents of FIGS. 9, through 11 correspond to those of FIG. 8, in which black circles represent ejection orifices to be used for recording and white circles represent the other ejection orifices that are not used for recording.

Suppose that the recording head(s) having ejection orifice rows as shown in FIG. 10 is used. In this case, a driving signal is given to the preceding ejection orifice group with timing d/v (sec) earlier than the following ejection orifice group, where d (inch) is distance between the odd- and even-numbered ejection orifice groups, and v (inch/sec) is scanning speed of the recording head in the main scan direction.

It should be noted that the above-mentioned recording heads could constitute recording means in each configuration. In the configuration of FIG. 8, the first recording head 801 and the second recording head 802 may be called a first ejection orifice row and a second ejection orifice row, respectively. Therefore, the combination of the heads 801 and 802 can be generically called the recording means. In the configuration of FIG. 9, the ejection orifice row for black ink and the ejection orifice row for color ink may be called a first ejection orifice row and a second ejection orifice row, respectively. Therefore, the recording head 901 can be called the recording means. Further, in the configuration shown at (1) of FIG. 10, the recording heads 1001 and 1002 may be called a first ejection orifice row and a second ejection orifice row, respectively. Therefore, the recording heads 1001 and 1002 can be generically called the recording means. In the configuration shown at (2) of FIG. 10, the ejection orifice row for black ink and the ejection orifice row for color ink may be called a first ejection orifice row and a second ejection orifice row, respectively. Therefore, the recording head 1003 can be called the recording means. In the configuration of FIG. 11, the recording heads 1101 and 1102 may be called a first ejection orifice row and a second ejection orifice row, respectively. Therefore, the recording heads 1101 and 1102 can generically called the recording means.

The Ka value of the black ink measured by the Bristow tester is 1.0 [ml·m$^{-2}$·msec$^{-1/2}$], and the Ka value of the color ink measured by the Bristow tester is 7.0 [ml·m$^{-2}$·msec$^{-1/2}$]. Since black ink normally has lower penetrability than color ink, the Ka value of black ink becomes smaller.

Figure 12:
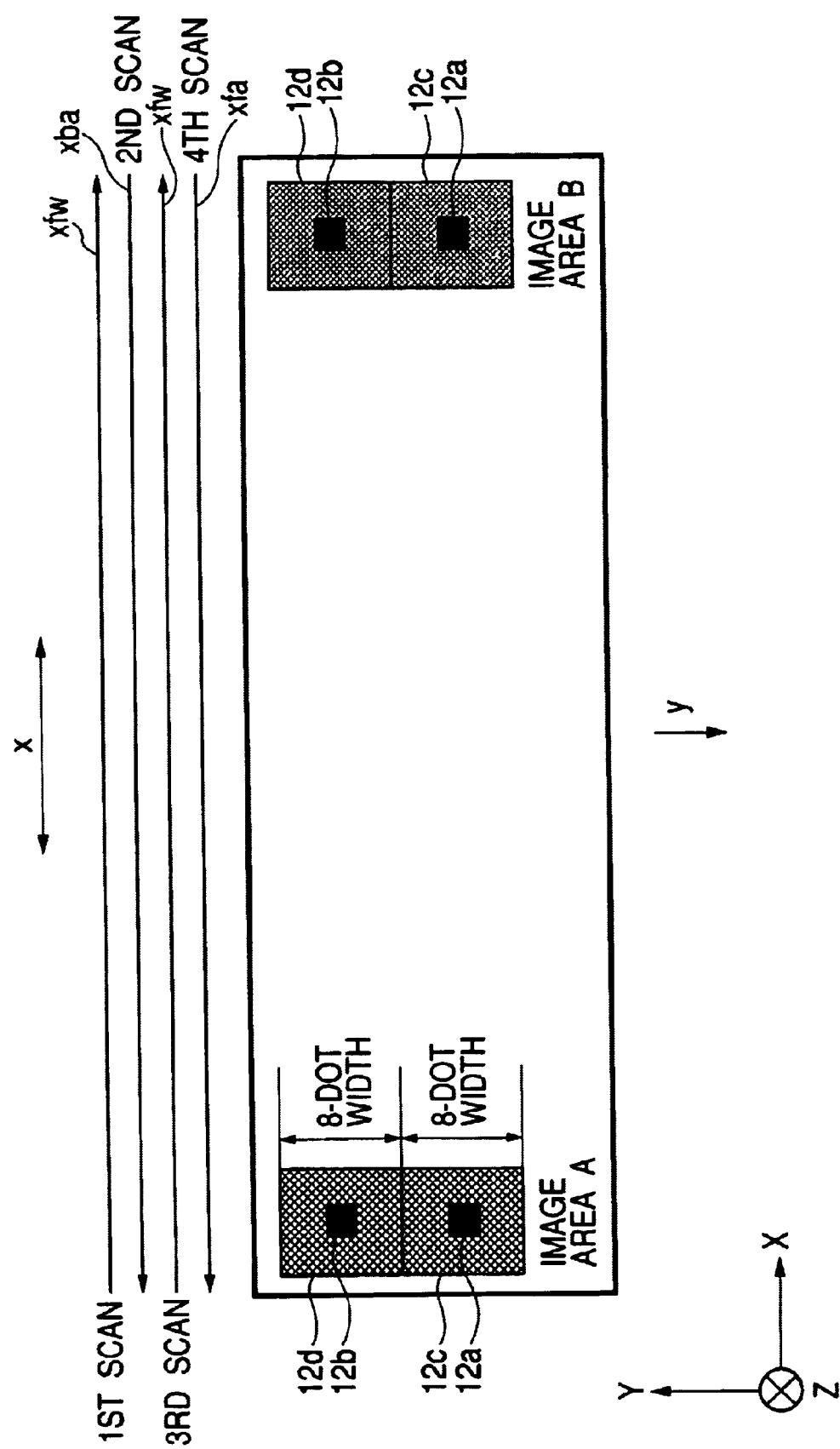
FIG. 12 is a view showing positions of recording image areas according to the first embodiment of the present invention.
Figure 14:
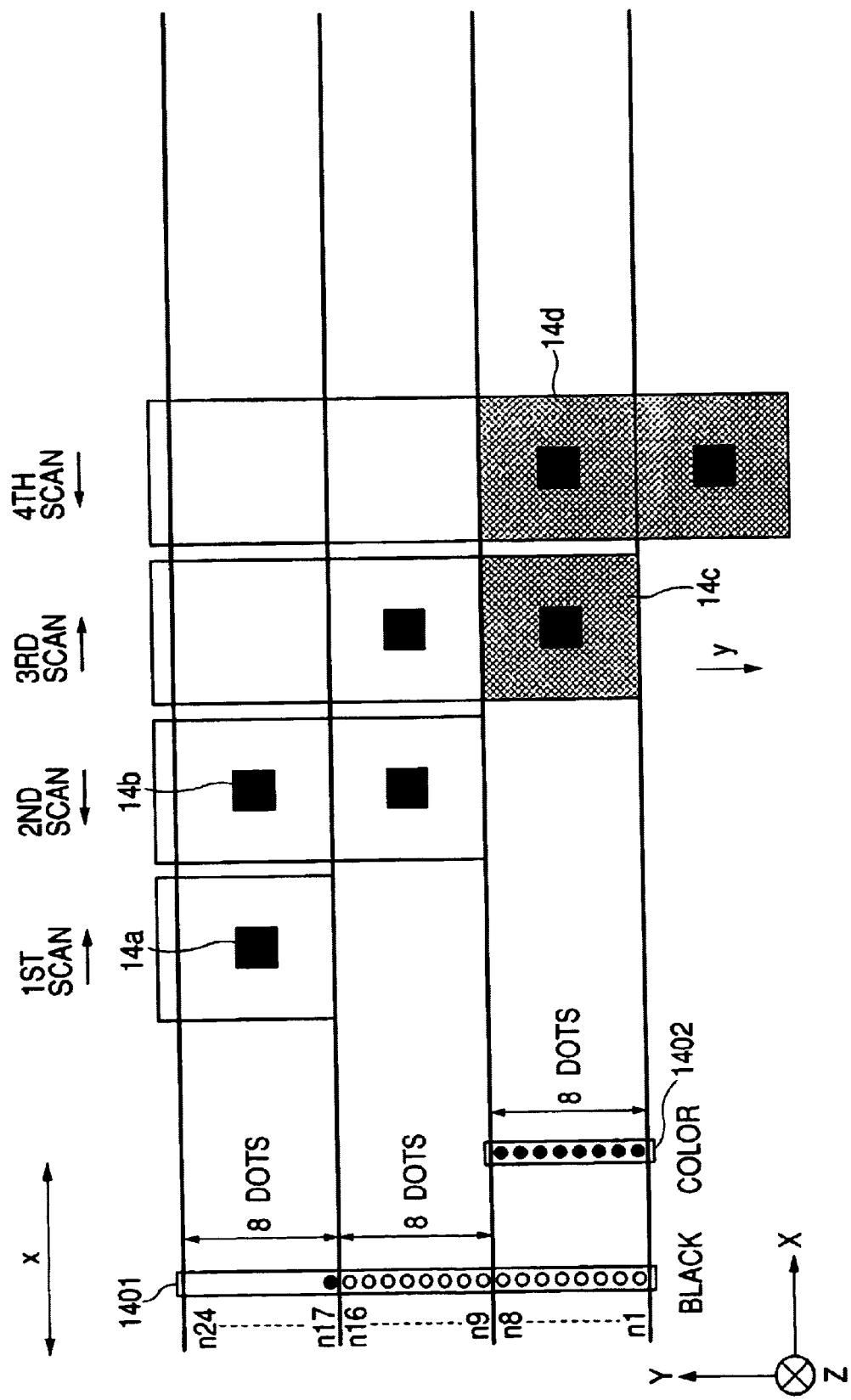
FIG. 14 is a view explaining a recording method according to the first embodiment of the present invention.

Referring next to FIGS. 12, 13 and 14, a one-pass reciprocating recording method according to the first embodiment of the present invention will be described.

FIG. 12 is a diagram showing image areas to be completed by the recording method according to the embodiment, in which a description of each image area is made for each scan of the reciprocating operation. In FIG. 12, image areas A and B are located in both end parts of an A4-size recording medium. Further, an arrow indicated with xfw represents a forward scan direction, while an arrow indicated with xba represents a backward scan direction. In other words, odd-numbered scans correspond to scans in the forward direction, while even-numbered scans correspond to scans in the backward direction. FIG. 13 is a table showing time differences between main scans for completing each image area in the embodiment. FIG. 14 is a diagram for explaining images to be recorded at each main scan until each image area is completed.

At first, the eight nozzles n17 to n24 of the recording head for ejecting the black ink are used at the first scan shown in FIG. 14. At the first scan, a part 12a of the image area A and a part 12a of the image area B of FIG. 12 are recorded in this order in a one-pass operation. In this case, the parts 12a of the image areas A and B correspond to a black data area 14a in FIG. 14.

Then, a paper feed motor drives the recording medium in the sub-scan direction over a distance of eight dots/600 dpi. After that, the recording head is scanned at the second scan in the direction opposite to that of the first scan (the direction of the arrow xba in FIG. 12). At the second scan, the eight nozzles n17 to n24 of the recording head for ejecting the black ink are used to record a part 12b of the image area B and a part 12b of the image area A of FIG. 12 in this order in the one-pass operation. In this case, the parts 12b of the image areas B and A correspond to a black data area 14b in FIG. 14. A time difference T1 between the first and second scans for recording the image area A is 0.35 sec, while a time difference T2 between the first and second scans for the image area B is 0.15 sec.

Then, the paper feed motor drives the recording medium in the sub-scan direction over the distance of eight dots/600 dpi. After that, the recording head is scanned at the third scan in the same direction as that of the first scan (the direction of the arrow xfw in FIG. 12). At the third scan, all the eight nozzles of the recording head for ejecting the color ink are used to record a part 12c of the image area A and a part 12c of the image area B of FIG. 12 in the one-pass operation. In this case, the parts 12c of the image areas A and B correspond to a color data area 14c in FIG. 14. The time difference T2 between the second and third scans for recording the image area A is 0.15 sec, while a time difference T1 between the second and third scans for recording the image area B is 0.35 sec.

Then, the paper feed motor drives the recording medium in the sub-scan direction over the distance of eight dots/600 dpi. After that, the recording head is scanned at the fourth scan in the same direction as that of the second scan. At the fourth scan, all the eight nozzles of the recording head for ejecting the color ink are used to record a part 12d of the image area B and a part 12d of the image area A of FIG. 12 in this order in the one-pass operation. In this case, the parts 12d of the image areas B and A correspond to a color data area 14d in FIG. 14. The time difference T1 between the third and fourth scans for recording the image area A is 0.35 sec, while a time difference T2 between the third and fourth scans for recording the image area B is 0.15 sec.

In the embodiment, the amount of conveyance of the recording medium at each scan, L is eight dots (L=eight dots/600 dpi). The number of times of record scans to make the first ejection orifice row complete black image formation, m is one (m=1). The number of times of record scans to make the second ejection orifice row complete color image formation, n is one (n=1). Using the spacing parameter, (m+a)×L according to the present invention, since such a value a as to make (m+a) an even number is one (a=1), (m+1)×L=(1+1)×8=16 dots/600 dpi. In other words, the position of the top of the ejection orifices in the second ejection orifice row, to be used from the paper feed side from which the recording medium is fed is spaced 16 dots/600 dpi apart from the first ejection orifice row. In this case, a time difference between the time the part 12a of the image area A is completed at the first scan and the part 12c thereof is completed at the third scan is determined from FIG. 13 as T2+T1=0.5 sec. A time difference between completion of parts 12a and 12c of the image area B is also determined from FIG. 13 as T2+T1=0.5 sec. Similarly, a time difference between the time the part 12b of the image area A is completed at the second scan and the part 12 thereof is completed at the fourth scan is determined from FIG. 13 as T1+T2=0.5. A time difference between completion of the parts 12b and 12d of the image area B is also determined from FIG. 13 as T1+T2=0.5 sec. Thus the time differences are all made equal to one another, which makes it possible to prevent color shading.

In the above-mentioned embodiment, the position of the top of the ejection orifices in the second ejection orifice row for ejecting the color ink is spaced a length away from the first ejection orifice row for ejecting the black ink. The length is determined according to the values m, n and such a condition that the value a makes (m+a) an even number. As mentioned above, m is the number of times of record scans to make the first ejection orifice row complete black image formation, and n is the number of times of record scans to make the second ejection orifice complete color image formation. Under the circumstances, recording is performed by the reciprocating scanning method, which makes differences in recording time between colors equal to each other. As a result, the problems caused by reciprocating recording can be solved to achieve high-quality image recording.

In the embodiment, recording is performed on the recording medium by ejecting the black ink having a lower Ka value measured by the Bristow tester prior to ejecting the color ink having a higher Ka value measured by the Bristow tester, which improves the penetrability or fixing properties on the recording medium. Further, since color is always recorded at a constant interval of 0.5 sec. after black is recorded, bleeding between colors (between black and color) can be prevented.

In the embodiment, the above-mentioned control is performed, which makes it possible to provide an ink jet recording apparatus capable of recording high-quality images in which color shading and bleeding between colors inherent in reciprocating recording are prevented.

(Second Embodiment)

Next, the second embodiment of the present invention will be described with reference to the accompanying drawings.

Figure 15:
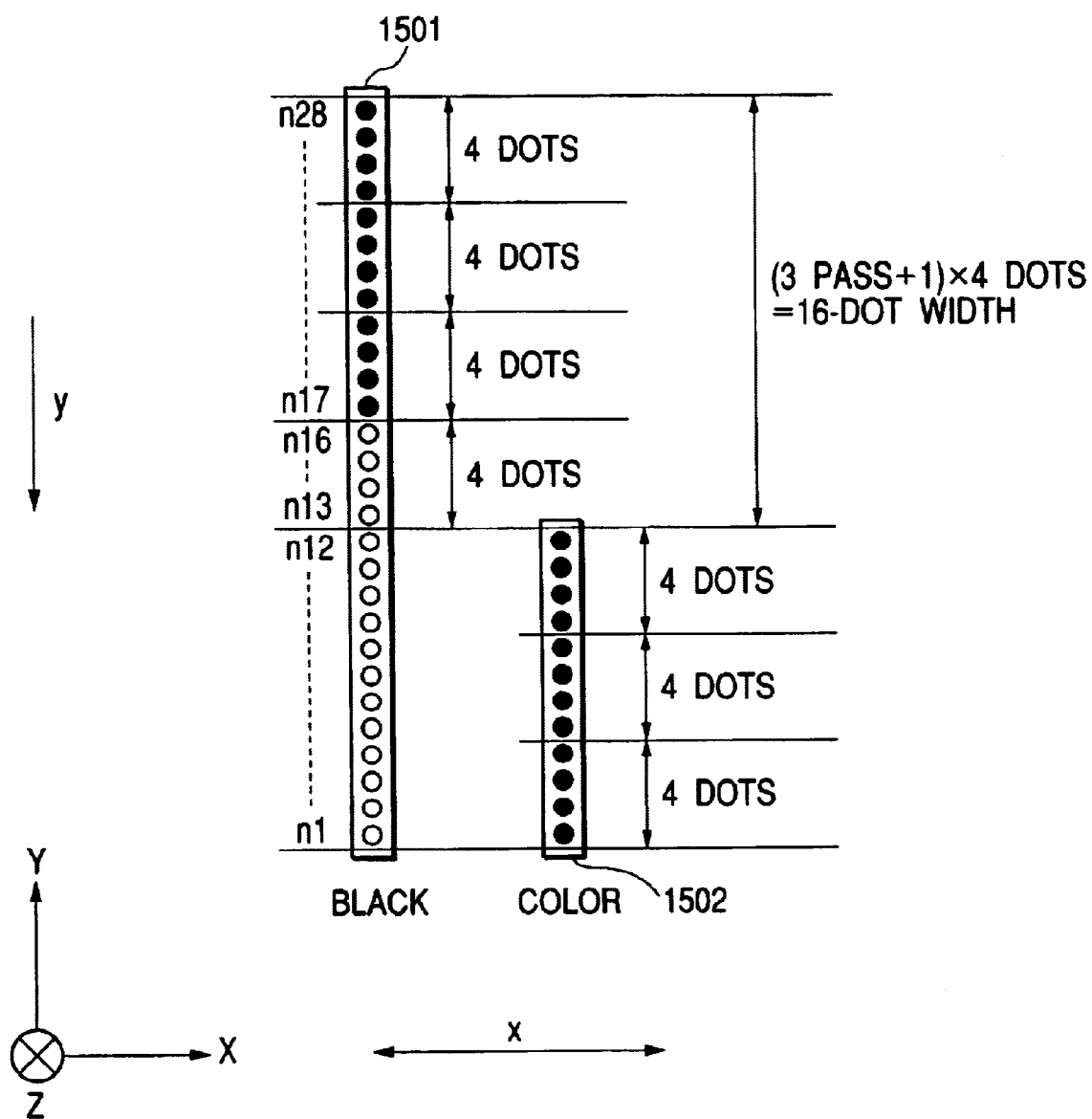
FIG. 15 is a view showing a configuration of separate type recording heads according to a second embodiment of the present invention.

FIG. 15 is a schematic diagram showing recording heads and the number of ejection orifices to be used in the recording operation according to the second embodiment of the present invention. As shown in FIG. 15, a first recording head 1501 for ejecting a black ink has 28 ejection orifices (28 nozzles), where the number of ejection orifices n=28, at a density of 600 dots per inch (600 dpi), where the number of ejection orifices N per inch=600. In the recording method according to the second embodiment of the present invention, 12 ejection orifices n17 to n28 are used to eject the black ink. On the other hand, a second recording head 1502 for ejecting a color ink has 12 ejection orifices (12 nozzles), where the number of ejection orifices n=12, at the density of 600 dots per inch (600 dpi), where the number of ejection orifices N per inch=600. In the recording method according to the second embodiment of the present invention, all the 12 ejection orifices n1 to n12 are used to eject the color ink. Like in the first embodiment, black circles in FIG. 15 represent ejection orifices to be used in the recording operation according to the embodiment. With the positional relation between the recording heads, all the ejection orifices (nozzles) are aligned according to the ejection orifice numbers in a sub-scan direction (indicated with an arrow y in the drawing). On the other hand, the recording heads are arranged with a predetermined space from each other in a main scan direction (indicated with an arrow x in the drawing). Like in the first embodiment, the recording head for ejecting the black ink and the recording head for ejecting the color ink may be formed together as one unit, rather than separately from each other. The ejection orifices may also be arranged in a zigzag manner, rather than being aligned in one row. Further, the number of ejection orifices of the second recording head may be the same as that of the first recording head. The inks used in this embodiment is the same as those used in the first embodiment.

Referring next to FIGS. 16, 17, 18 and 19, a multi-pass reciprocating recording method according to the second embodiment of the present invention will be described.

Figure 16:
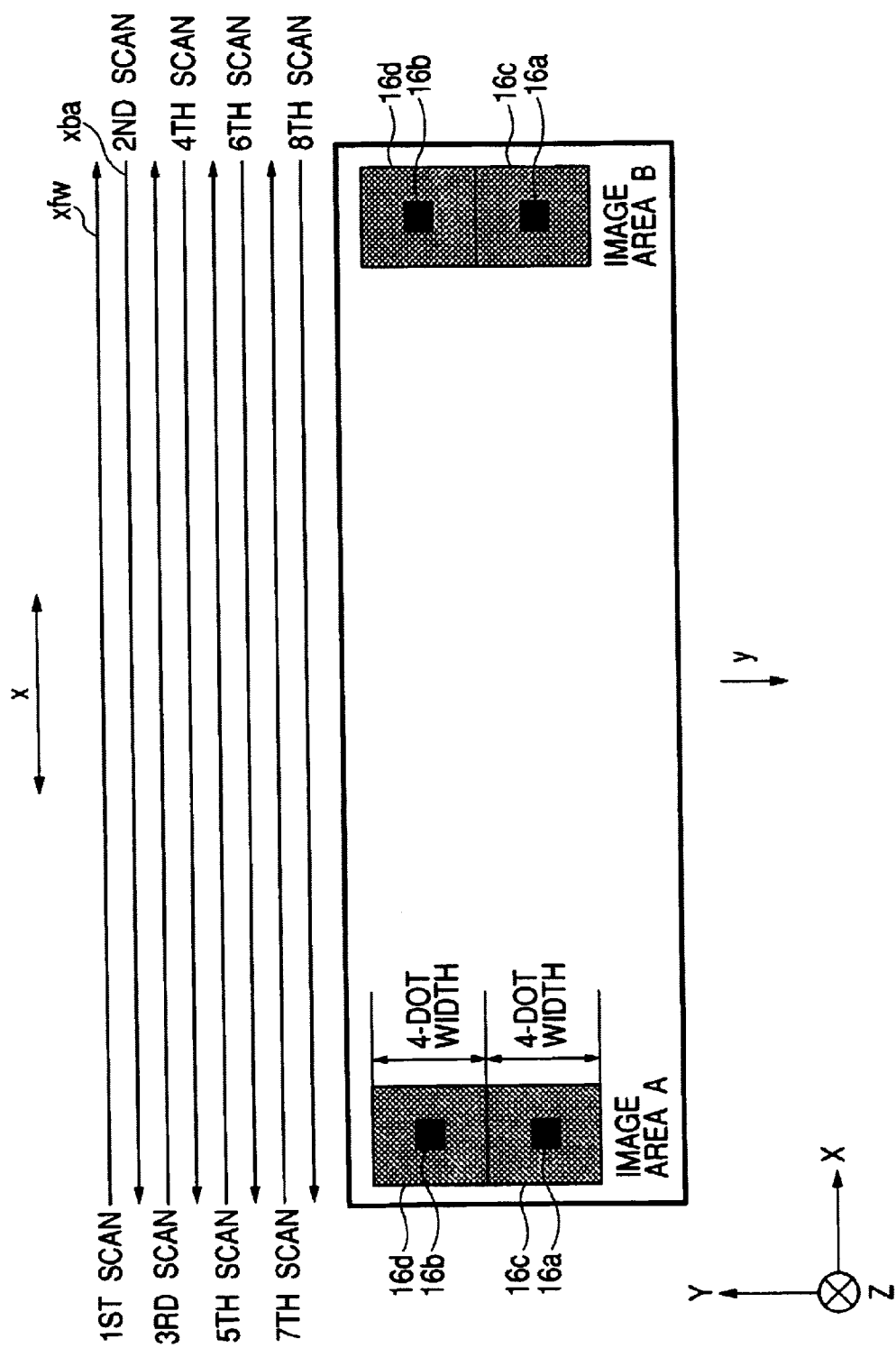
FIG. 16 is a view showing positions of recording image areas according to the second embodiment of the present invention.

FIG. 16 shows image areas to be completed by the recording method according to the embodiment. In FIG. 16, image areas A and B are located in both end parts of an A4-size recording medium. FIG. 17 is a table showing time differences between main scans for completing each image area in the embodiment. Indicated at (a), (b) and (c) of FIG. 18 are three kinds of thinning-out patterns to be complementary to one another. In these patterns, the inside of each grid corresponds to the position of each dot to be recorded, and the blackened grids indicate positions at which ink is ejected to record dots. The other grids that are not painted out or blackened indicate thinned-out positions on which dots are not recorded. Using these thinning-out patterns to mask data indicative of dots to be recorded, the data are so converted that only the blackened positions in the patterns are recorded without being masked out.

Figure 19:
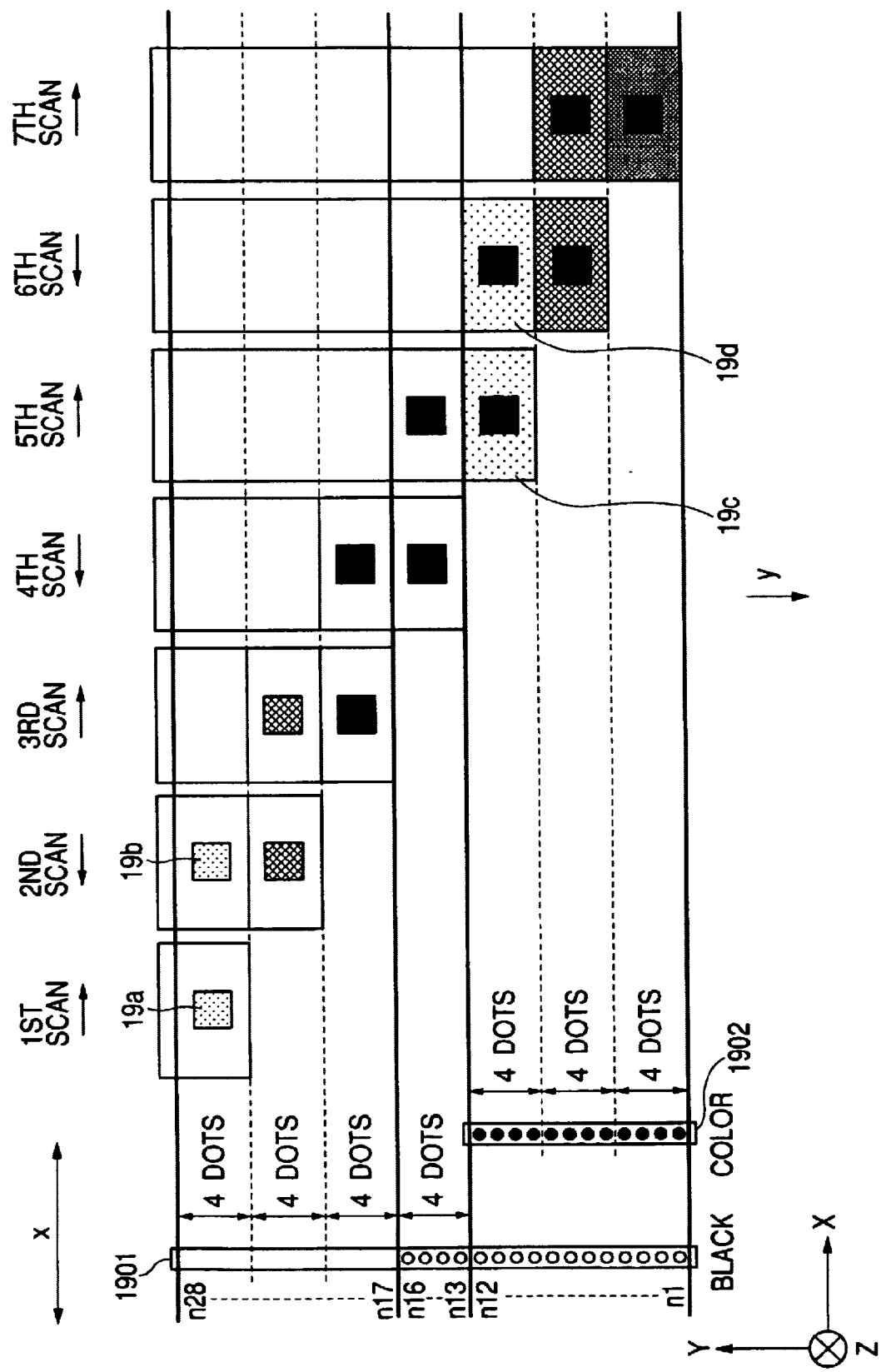
FIG. 19 is a view explaining a recording method according to the second embodiment of the present invention.

At first, the recording head for black ink is scanned in the direction of the arrow xfw at the first scan shown in FIG. 19. At the first scan, four nozzles n25 to n28 out of the 12 nozzles to be used for ejecting the black ink from the recording head are used to eject the black ink according to the thinning-out pattern (a) of FIG. 18. As a result, a part 16a of the image area A and a part 16a of the image area B shown in FIG. 16 are recorded in this order in the thinning-out pattern (a) of FIG. 18. In this case, the parts 16a of the image areas A and B correspond to a black data area 19a in FIG. 19.

Then, the paper feed motor drives the recording medium in the sub-scan direction over a distance of four dots/600 dpi. After that, the recording head for black ink is scanned at the second scan in the direction opposite to that of the first scan (the direction of the arrow xba in the drawing). At the second scan, four nozzles n21 to n24 out of the 12 nozzles to be used for ejecting the black ink from the recording head are used to eject the black ink according to the thinning-out pattern (b) of FIG. 18. As a result, the part 16a of the image area B and the part 16a of the image area A shown in FIG. 16 are recorded in this order in the thinning-out pattern (b) of FIG. 18. In this case, the parts 16a of the image areas B and A correspond to the black data area 19a in FIG. 19. On the other hand, the four nozzles n25 to n28 are used to eject the black ink according to the thinning-out pattern (a) of FIG. 18 in the same manner as at the last scan. As a result, a part 16b of the image area B and a part 16b of the image area A shown in FIG. 16 are recorded in this order in the thinning-out pattern (a) of FIG. 18. In this case, the parts 16b of the image areas B and A correspond to a black data area 19b in FIG. 19. A time difference T1 between the first and second scans for recording the image area A is 0.35 sec, while a time difference T2 between the first and second scans for recording the image area B is 0.15 sec.

Then, the recording medium is conveyed over the distance of four dots/600 dpi in the same manner as at the last scan. After that, the recording head is scanned at the third scan in the same direction as that of the first scan. At the third scan, four nozzles n17 to n20 out of the 12 nozzles to be used for ejecting the black ink from the recording head are used to eject the black ink according to the thinning-out pattern (c) of FIG. 18. As a result, the part 16a of the image area A and the part 16a of the image area B shown in FIG. 16 are completed. In this case, the parts 16a of the image areas A and B correspond to the black data area 19a in FIG. 19. On the other hand, the four nozzles n21 to n24 are used to eject the black ink according to the thinning-out pattern (b) of FIG. 18 in the same manner as at the last scan. As a result, the part 16b of the image area A and the part 16b of the image area B shown in FIG. 16 are recorded in this order in the thinning-out pattern (b) of FIG. 18. In this case, the parts 16b of the image areas A and B correspond to the black data area 19b in FIG. 19. A time difference T2 between the second and third scans for recording the image area A is 0.15 sec, while a time difference T1 between the second and third scans for recording the image area B is 0.35 sec.

Further, the recording medium is conveyed over the distance of four dots/600 dpi in the same manner as at the last scan. Then the recording head is scanned at the fourth scan in the same direction as that of the second scan. At the fourth scan, recording of the black data area 19a in FIG. 19 is not performed because it has already been completed. On the other hand, the four nozzles n17 to n20 are used to eject the black ink according to the thinning-out pattern (c) of FIG. 18 in the same manner as at the last scan. As a result, the part 16b of the image area B and the part 16b of the image area A shown in FIG. 16 are completed. In this case, the parts 16b of the image areas B and A correspond to the black data area 19b in FIG. 19. A time difference T1 between the third and fourth scans for recording the image area A is 0.35 sec, while a time difference T2 between the third and fourth scans for recording the image area B is 0.15 sec.

Further, the recording medium is conveyed over the distance of four dots/600 dpi in the same manner as at the last scan. Then the recording head for ejecting the color ink is scanned at the fifth scan in the same direction as that of the first scan. At the fifth scan, four nozzles n9 to n12 out of the 12 nozzles to be used for ejecting the color ink from the recording head are used to eject the color ink according to the thinning-out pattern (a) of FIG. 18. As a result, a part 16c of the image area A and a part 16c of the image area B shown in FIG. 16 are recorded in this order in the thinning-out pattern (a) of FIG. 18. In this case, the parts 16c of the image areas A and B correspond to a black data area 19c in FIG. 19. A time difference T2 between the fourth and fifth scans for recording the image area A is 0.15 sec, while a time difference T1 between the fourth and fifth scans for recording the image area B is 0.35 sec.

Further, the recording medium is conveyed over the distance of four dots/600 dpi in the same manner as at the last scan. Then the recording head for ejecting the color ink is scanned at the sixth scan in the same direction as that of the second scan. At the sixth scan, four nozzles n5 to n8 out of the 12 nozzles to be used for ejecting the color ink from the recording head are used to eject the color ink according to the thinning-out pattern (b) of FIG. 18. As a result, the part 16c of the image area B and the part 16c of the image area A shown in FIG. 16 are recorded in this order in the thinning-out pattern (b) of FIG. 18. In this case, the parts 16c of the image areas B and A correspond to the black data area 19c in FIG. 19. On the other hand, the four nozzles n9 to n12 are used to eject the color ink according to the thinning-out pattern (a) of FIG. 18 in the same manner as at the last scan. As a result, a part 16d of the image area B and a part 16d of the image area A shown in FIG. 16 are recorded in this order in the thinning-out pattern (a) of FIG. 18. In this case, the parts 16d of the image areas B and A correspond to a black data area 19d in FIG. 19. A time difference T1 between the fifth and sixth scans for recording the image area A is 0.35 sec, while a time difference T2 between the fifth and sixth scans for recording the image area B is 0.15 sec.

Further, the recording medium is conveyed over the distance of four dots/600 dpi in the same manner as at the last scan. Then the recording head for ejecting the color ink is scanned at the seventh scan in the same direction as that of the first scan. At the seventh scan, the remaining four nozzles n1 to n4 out of the 12 nozzles to be used for ejecting the color ink from the recording head are used to eject the color ink according to the thinning-out pattern (c) of FIG. 18. As a result, the part 16c of the image area A and the part 16c of the image area B shown in FIG. 16 are completed. In this case, the parts 16c of the image areas A and B correspond to the black data area 19c in FIG. 19. On the other hand, the four nozzles n5 to n8 are used to eject the color ink according to the thinning-out pattern (b) of FIG. 18 in the same manner as at the last scan. As a result, the part 16d of the image area A and the part 16d of the image area B shown in FIG. 16 are recorded in this order in the thinning-out pattern (b) of FIG. 18. In this case, the parts 16d of the image areas A and B correspond to the color data area 19d in FIG. 19. A time difference T2 between the sixth and seventh scans for recording the image area A is 0.15 sec, while a time difference T1 between the sixth and seventh scans for recording the image area B is 0.35 sec.

Further, the recording medium is conveyed over the distance of four dots/600 dpi in the same manner as at the last scan. Then the recording head for ejecting the color ink is scanned at the eighth scan (not shown) in the same direction as that of the second scan. At the eighth scan, recording of the color data area 19c in FIG. 19 is not performed because it has already been completed. On the other hand, the four nozzles n1 to n4 are used to eject the color ink according to the thinning-out pattern (c) of FIG. 18 in the same manner as at the last scan. As a result, the part 16d of the image area B and the part 16d of the image area A shown in FIG. 16 are completed. In this case, the parts 16d of the image areas B and A correspond to the color data area 19d in FIG. 19. A time difference T1 between the seventh and eighth scans for recording the image area A is 0.35 sec, while a time difference T2 between the seventh and eighth scans for recording the image area B is 0.15 sec.

In the embodiment, the amount of conveyance of the recording medium at each scan, L is four dots (L=four dots/600 dpi). The number of times of record scans to make the first ejection orifice row complete black image formation, m is three (m=3). The number of times of record scans to make the second ejection orifice row complete color image formation, n is three (n=3). Using the spacing parameter, (m+a)×L according to the present invention, since such a value a as to make (m+a) an even number is one (a=1), (m+1)×L=(3+1)×4=16 dots/600 dpi. In other words, the position of the top of the ejection orifices in the second ejection orifice row, to be used from the paper feed side from which the recording medium is fed is spaced 16 dots/600 dpi apart from the first ejection orifice row. In this case, a time difference between the time black image recording of the part 16a of the image area A is started at the first scan and color image recording of the part 16c thereof is started at the fifth scan is determined from FIG. 17 as T1+T2+T1+T2=1.0 sec. On the other hand, a time difference between the first and fifth scans related to the image area B is also determined from FIG. 17 as T2+T1+T2+T1=1.0 sec. Thus the time differences between the image areas A and B during the interval from the first scan to the fifth scan are made equal to each other. Similarly, a time difference between the time black image recording of the part 16b of the image area A is started at the second scan and color image recording of the part 16d thereof is started at the sixth scan is determined from FIG. 17 as T2+T1+T2+T1=1.0 sec. On the other hand, a time difference between the second and sixth scans related to the image area B is also determined from FIG. 17 as T1+T2+T1+T2=1.0 sec. Thus the time differences between the image areas A and B during the interval from the second scan to the sixth scan are also made equal to each other.

The time differences are all made equal to one another, which makes it possible to prevent color shading. In addition, the multi-pass recording method for making each recording head complete image formation at three record scans is effective in preventing bleeding between colors (between black and color) inherent in multi-pass recording. Particularly, in the embodiment, recording is performed on the recording medium by ejecting the black ink having a lower Ka value measured by the Bristow tester prior to ejecting the color ink having a higher Ka value measured by the Bristow method, which improves the penetrability or fixing properties on the recording medium. Further, since color is always recorded at a constant interval of 0.5 sec, after black is recorded, bleeding between colors (between black and color) can be prevented. It should be noted that in the embodiment the thinning-out patterns are fixed patterns, but the thinning-out patterns may be random thinning-out patterns so that they will not synchronize with patterns of image data.

In the embodiment, the above-mentioned control is performed, which makes it possible to provide an ink jet recording apparatus capable of recording high-quality images in which color shading and bleeding between colors inherent in the reciprocating multi-pass recording method are prevented.

(Third Embodiment)

Figure 20:
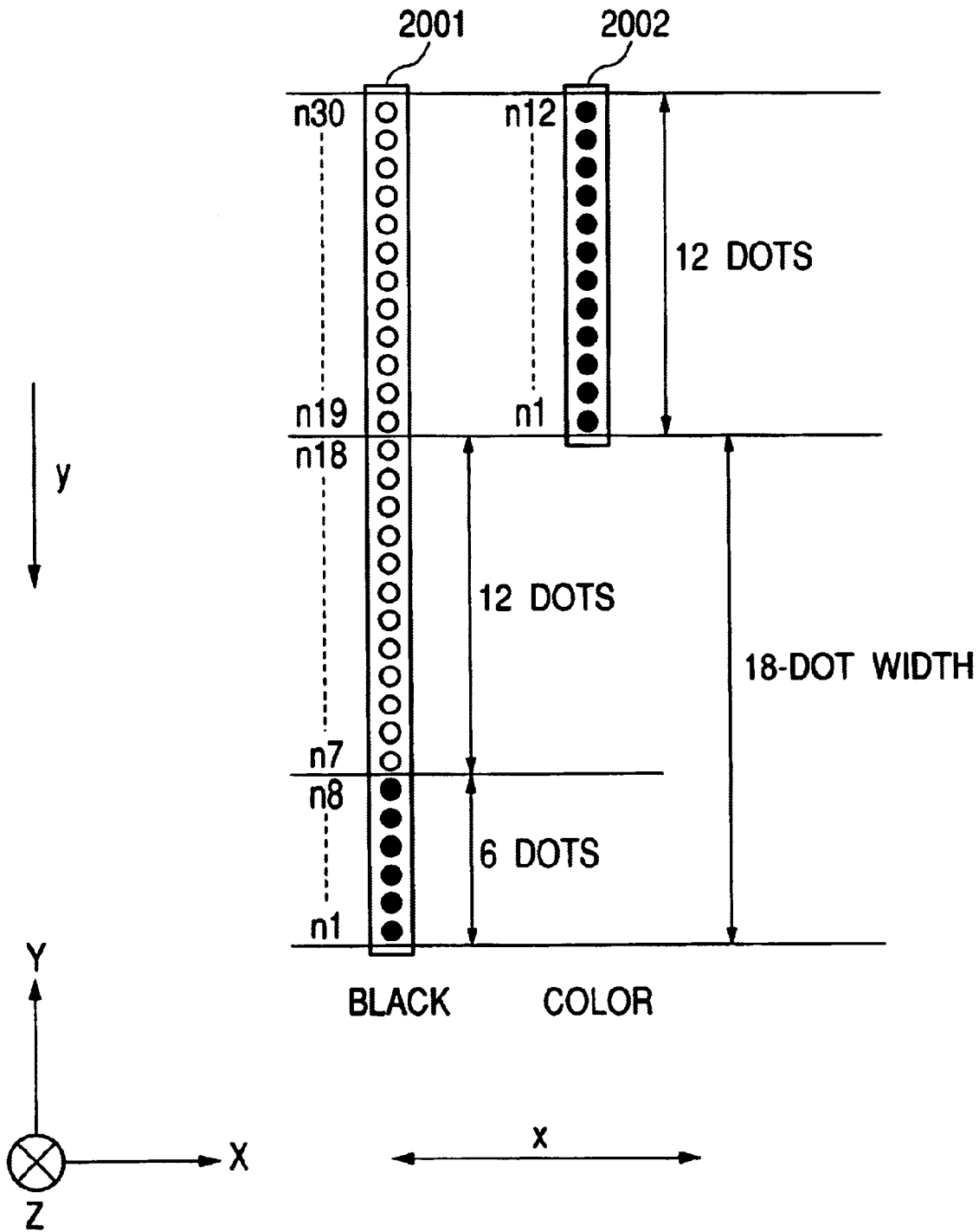
FIG. 20 is a view showing a configuration of recording heads applicable to a third embodiment of the present invention.

FIG. 20 is a schematic diagram showing recording heads and the number of ejection orifices to be used in the recording operation according to the third embodiment of the present invention.

As shown in FIG. 20, a first recording head 2001 has 30 ejection orifices (30 nozzles), where the number of ejection orifices n=30, for ejecting a black ink at the same density of 600 dpi as that described in the first embodiment. In the recording method according to the third embodiment of the present invention, six ejection orifices n1 to n6 are used for ejecting the black ink. On the other hand, a second recording head 2002 has 12 ejection orifices (12 nozzles), where the number of ejection orifices n=12, for ejecting a color ink at the same density of 600 dpi as in the above embodiment. In the recording method according to the third embodiment of the present invention, all the 12 ejection orifices n1 to n 12 are used for ejecting the color ink. With the positional relation between the ejection orifices (nozzles), the recording heads are so arranged that the ejection orifice numbers n19 to n30 of the recording head for ejecting the black ink correspond to the ejection orifice numbers n1 to n12 of the recording head for ejecting the color ink in the sub-scan direction (indicated with the arrow y in the drawing). On the other hand, the recording heads are arranged at a predetermined space from each other in the main scan direction (indicated with the arrow x in the drawing). Like in the first embodiment, the recording head for ejecting the black ink and the recording head for ejecting the color ink may be formed together as one unit, rather than separately from each other. The ejection orifices may also be arranged in a zigzag manner, rather than being aligned in one row. Further, the number of ejection orifices of the second recording head may be the same as that of the first recording head. The inks used in this embodiment is the same as those used in the first embodiment.

Figure 21:
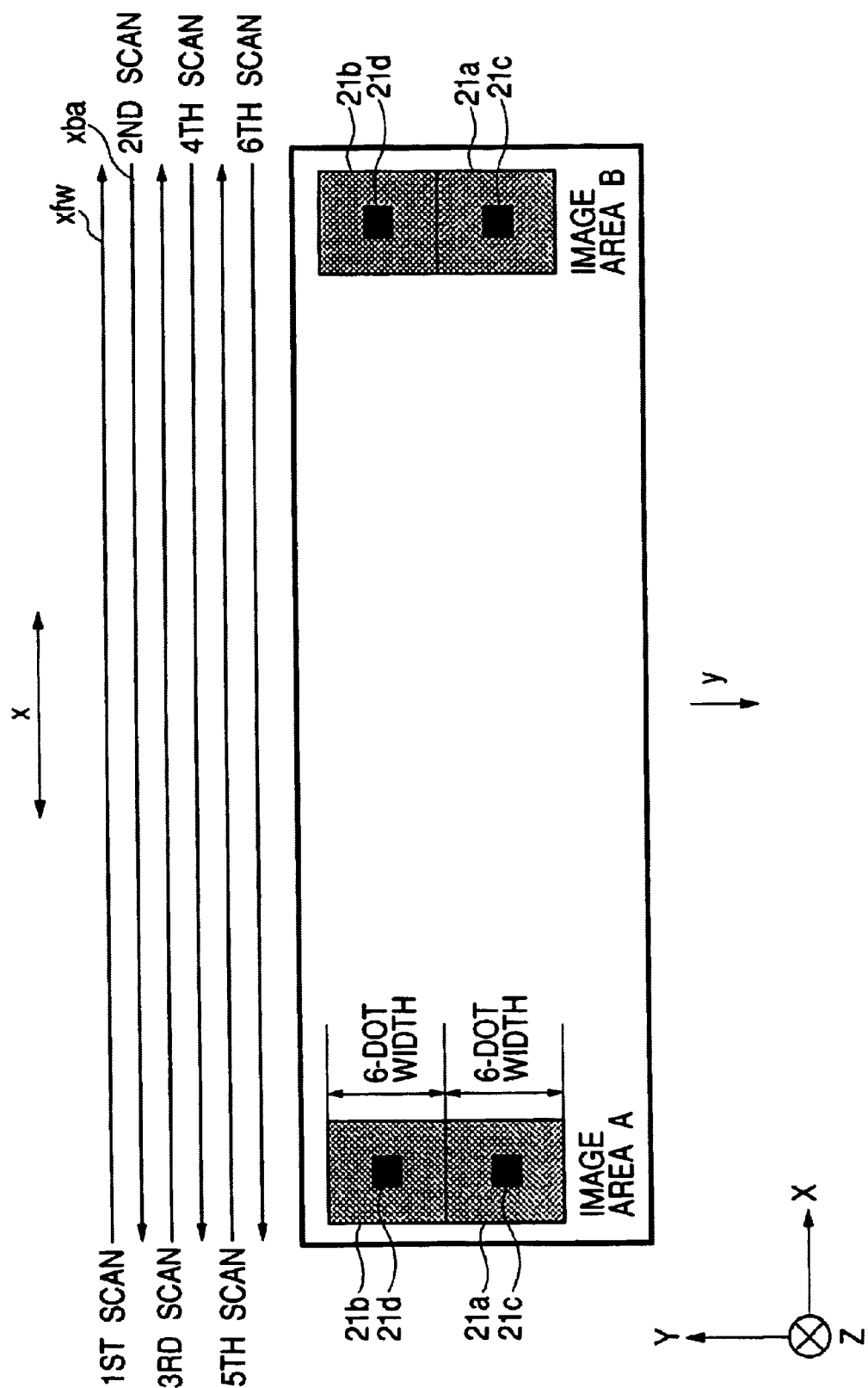
FIG. 21 is a view showing positions of recording image areas according to the third embodiment of the present invention.

Referring next to FIGS. 21, 22, 23 and 24, a reciprocating recording method according to the third embodiment of the present invention will be described. FIG. 21 shows image areas to be completed by the recording method according to the embodiment. In FIG. 21, image areas A and B are located in both end parts of an A4-size recording medium along the main scan direction (indicated with the arrow x in the drawing). Like in the above-mentioned embodiments, the arrow indicated with xfw represents a forward scan direction in the main scanning operation, while the arrow indicated with xba represents a backward scan direction in the main scanning operation.

Figures 22, 23:
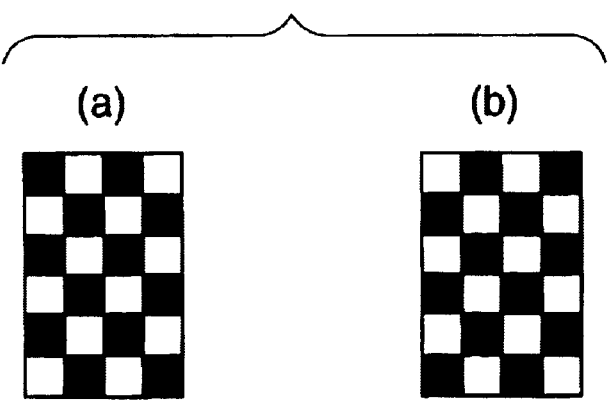
FIG. 22 is a table showing time differences in recording area between scans according to the third embodiment of the present invention.
FIG. 23 is a schematic view showing thinned-out patterns according to the third embodiment of the present invention.
Figure 24:
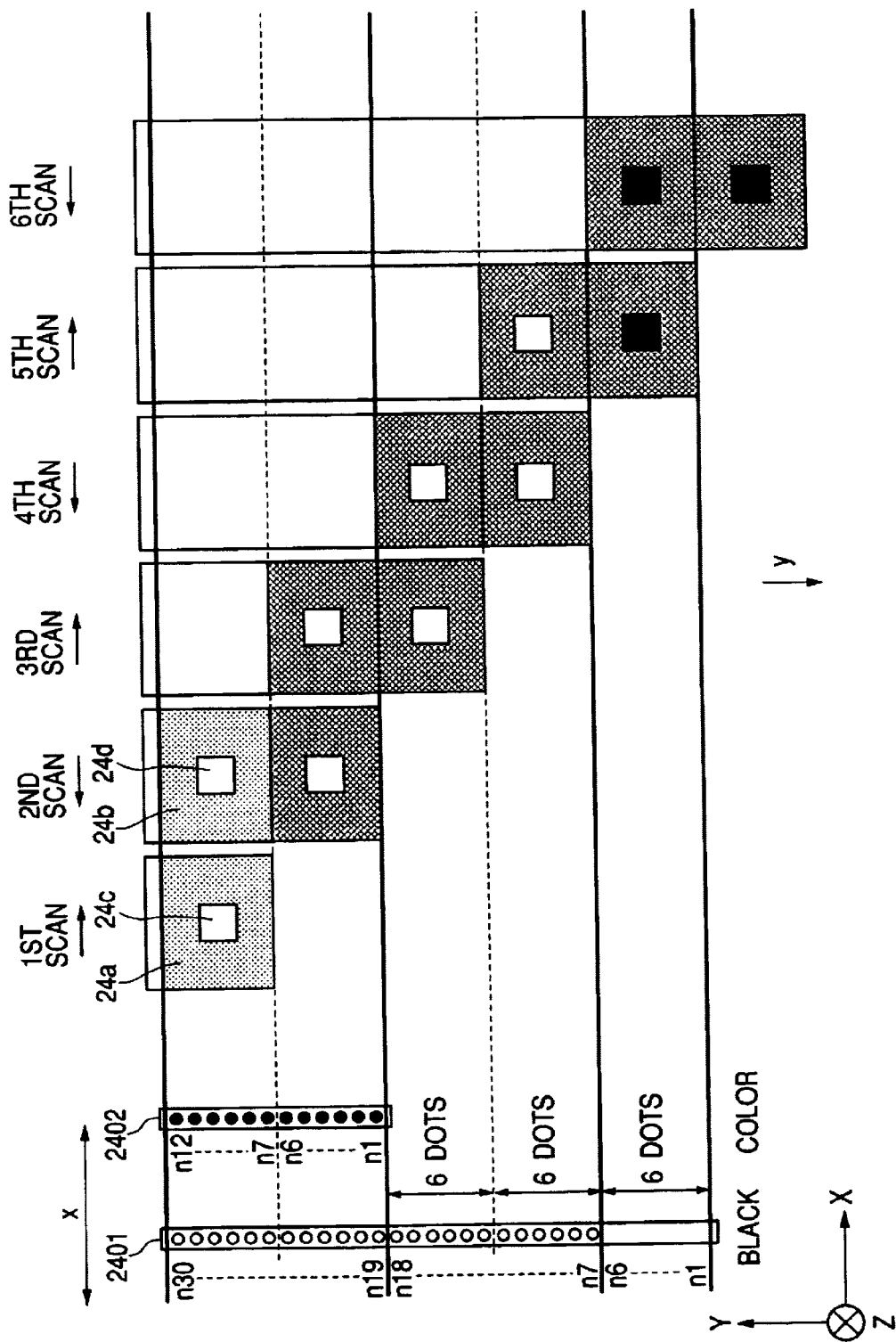
FIG. 24 is a view explaining a recording method according to the third embodiment of the present invention.

FIG. 22 is a table showing time differences between main scans for completing each image area in the embodiment. Indicated at (a) and (b) of FIG. 23 are two kinds of thinning-out patterns to be complementary to each other. Like the thinning-out patterns shown in FIG. 18, the inside of each grid corresponds to the position of each dot to be recorded, and the blackened grids indicate positions at which ink is ejected to record dots. The other grids that are not painted out or blackened indicate thinned-out positions on which dots are not recorded. Using these thinning-out patterns to mask data indicative of dots to be recorded, the data are so converted that only the blackened positions in the patterns are recorded without being masked out. The patterns shown at (a) and (b) of FIG. 24 are to thin out the recorded dots in a zigzag manner respectively. Since the patterns are complementary to each other, they are also called a "zigzag pattern" and a "reverse zigzag pattern", respectively. Further, such a zigzag pattern may be called a "checker flag pattern". FIG. 24 shows a diagram for explaining images to be recorded at each main scan until each image area is completed.

At first, the recording head for ejecting a color ink (the second recording head 2002 in FIG. 20) is scanned at the first scan shown in FIG. 24. At the first scan, six nozzles n7 to n12 out of the 12 nozzles to be used for ejecting the color ink are used to eject the color ink according to the thinning-out checker flag pattern (a) of FIG. 23. As a result, a part 21a of the image area A and a part 21a of the image area B shown in FIG. 21 are recorded in this order in the thinning-out checker flag pattern (a) of FIG. 23. In this case, the parts 21a of the image areas A and B correspond to a color data area 24a in FIG. 24.

Then, the paper feed motor drives the recording medium in the sub-scan direction over a distance of six dots/600 dpi. After that, the recording head for color ink is scanned at the second scan in the direction opposite to that of the first scan (the direction of the arrow xba in FIG. 21). At the second scan, the remaining six nozzles n1 to n6 to be used for ejecting the color ink are used to eject the color ink according to the thinning-out reverse checker flag pattern (b) of FIG. 23. As a result, the part 21a of the image area B and the part 21a of the image area A shown in FIG. 21 are recorded in this order in the thinning-out reverse checker flag pattern (b) of FIG. 23 to complete image formation on the parts 21a corresponding to the color data area 24a in FIG. 24. On the other hand, the six nozzles n7 to n12 are used to eject the color ink according to the thinning-out checker flag pattern (a) of FIG. 23 in the same manner as at the last scan. As a result, a part 21b of the image area B and a part 21b of the image area A shown in FIG. 21 are recorded in this order in the thinning-out checker flag pattern (a) of FIG. 23. In this case, the parts 21b of the image areas B and A correspond to a color data area 24b in FIG. 24.

Further, the recording medium is conveyed over the distance of six dots/600 dpi in the same manner as at the last scan. Then the recording head for color ink is scanned at the third scan in the same direction as that of the first scan. At the third scan, recording of the color data area 21a in FIG. 21 is not performed because it has already been completed. On the other hand, the six nozzles n1 to n6 are used to eject the color ink according to the thinning-out reverse checker flag pattern (b) of FIG. 23 in the same manner as at the last scan. As a result, the part 21b of the image area A and the part 21b of the image area B shown in FIG. 21 are completed. In this case, the parts 21b of the image areas A and B correspond to the color data area 24b in FIG. 24.

Further, the recording medium is conveyed over the distance of six dots/600 dpi in the same manner as at the last scan. Then the recording head for color ink is scanned at the fourth scan in the same direction as at the last scan. At the fourth scan, however, recording of the color data areas 24a and 24b is not performed because it has already been completed. On the other hand, the recording head 2001 for black ink is scanned, but recording with the recording head for black ink is not performed as well because there is no corresponding area to be recorded with the black ink.

Further, the recording medium is conveyed over the distance of six dots/600 dpi in the same manner as at the last scan. Then the recording head for ejecting the black ink (the first recording head 2001 in FIG. 20) is scanned at the fifth scan. At the fifth scan, all the six nozzles n1 to n6 to be used for ejecting the black ink are used to record a part 21c of the image area A and a part 21c of the image area B shown in FIG. 21 in this order. In this case, the parts 21a of the image areas A and B correspond to a black data area 24c in FIG. 24.

Further, the recording medium is conveyed over the distance of six dots/600 dpi in the same manner as at the last scan. Then the recording head for black ink is scanned at the sixth scan in the same direction as at the second scan. At the sixth scan, recording of the black data area 24c in FIG. 24 is not performed because it has already been completed. On the other hand, a part 21d of the image area B and a part 21d of the image area A are recorded in this order using in this order in the one-pass operation. In this case, the parts 21d of the image areas B and A correspond to a black data area 24d in FIG. 24.

In the embodiment, the amount of conveyance of the recording medium at each scan, L is six dots (L=six dots/600 dpi). The number of times of record scans to make the first recording head complete black image formation, m is one (m=1). The number of times of record scans to make the second recording head complete color image formation, n is two (n=2). Using the spacing parameter, (n+a)×L according to the present invention, since such a value a as to make (n+a) an even number is two (a=2), (m+1)×L=(3+1)×4=16 dots/600 dpi. In other words, the position of the top of the ejection orifices in the second ejection orifice row, to be used from the paper ejection side to which the recording medium is ejected is spaced 16 dots/600 dpi apart from the first ejection orifice row.

Paying our attention to the color area 21a and the black area 21c surrounded by the color area 21a in the image area A shown in FIG. 21, a time difference between the time color recording is started at the first scan and black recording is started at the fifth scan is determined from FIG. 22 as T1+T2+T1+T2=1.0 sec. On the other hand, a time difference related to the image area B is also determined from FIG. 22 as T2+T1+T2+T1=1.0 sec. Thus the time differences in recording of color and black areas between the image areas A and B are made equal to each other.

Turning our attention to the color image area 21b and the black image area 21d shown in FIG. 21, a time difference in the image area A between the time color recording is started at the second scan and black recording is started at the sixth scan is determined from FIG. 22 as T2+T1+T2+T1=1.0 sec. On the other hand, a time difference related to the image area B is also determined as T1+T2+T1+T2=1.0 sec. Thus the time differences between the image areas A and B during the interval from color recording is started until black recording is started are made equal to each other. In other words, the time difference in color area recording is made equal to that in black area recording, which makes it possible to prevent color shading.

In the embodiment, the first recording head (the recording head 2001 in FIG. 20) completes image formation after the second recording head (the recording head 2002 in FIG. 20). Further, in the embodiment, such a multi-pass recording method that the color recording head performs three record scans is combined with such a one-pass recording method that the black recording head completes image formation at one record scan. Any feature of the embodiment is very effective in preventing bleeding between colors (between black and color) inherent in multi-pass recording. It should be noted that in the embodiment the thinning-out patterns are fixed patterns, but the thinning-out patterns may be random thinning-out patterns so that they will not synchronize with patterns of image data.

In the embodiment, the above-mentioned control is performed, which makes it possible to provide an ink jet recording apparatus capable of recording high-quality images in which color shading and bleeding between colors inherent in the reciprocating multi-pass recording method are prevented.

(Fourth Embodiment)

Next, the fourth embodiment of the present invention will be described with reference to the accompanying drawings.

Figure 25:
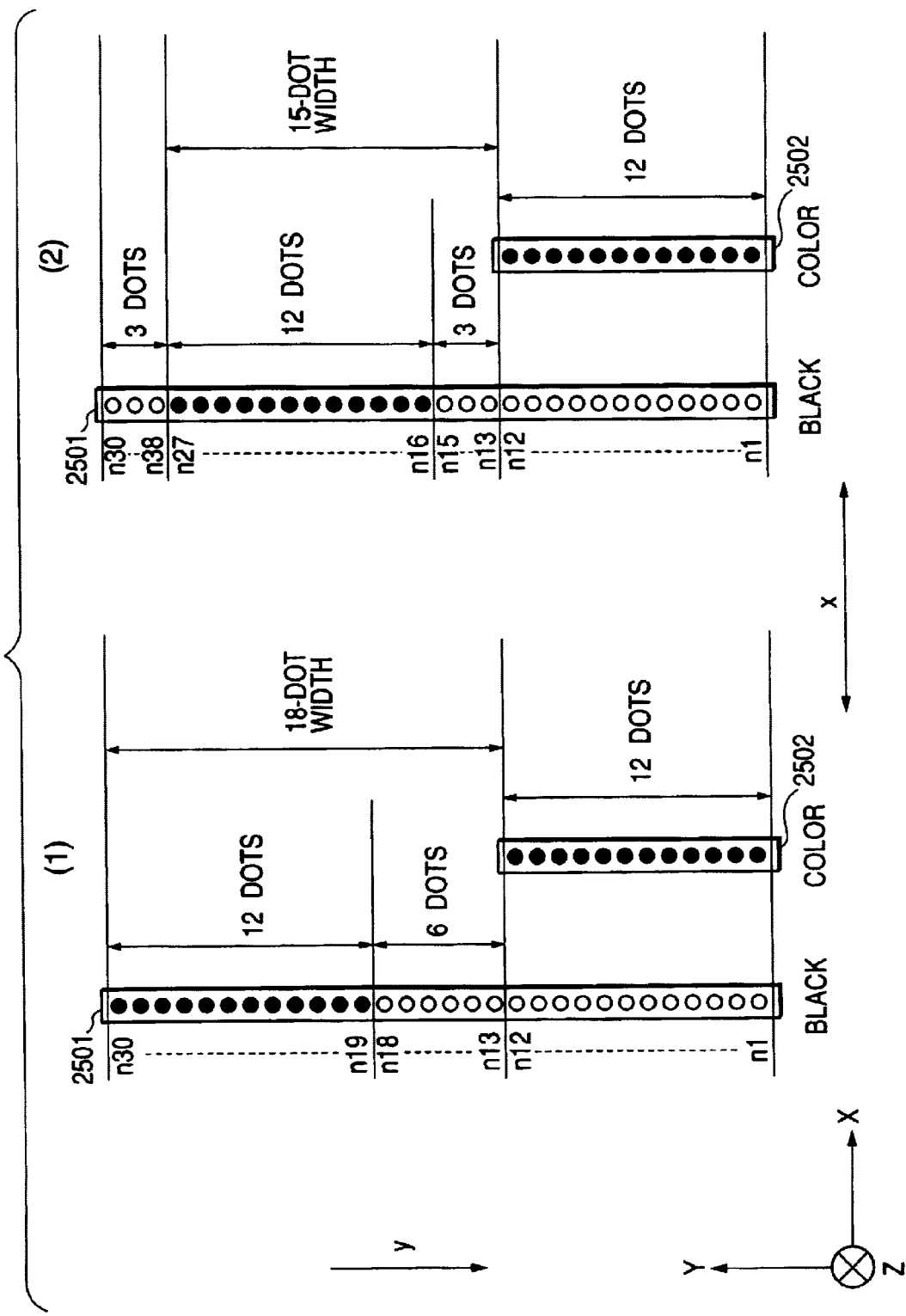
FIG. 25 is a view showing a configuration of separate type recording heads according to a fourth embodiment of the present invention.

FIG. 25 is a schematic diagram showing recording heads and the number of ejection orifices to be used in the recording operation according to the fourth embodiment of the present invention. As shown at (1) and (2) of FIG. 25, the reference numerals 2501 and 2502 designate a first recording head for ejecting a black ink and a second recording head for ejecting a color ink, respectively. Both of the recording heads 2501 and 2502 arrange ejection orifices in each row at a density of 600 dpi (in the number of ejection orifices per inch, N=600). The first recording head 2501 has 30 ejection orifices (30 nozzles), where the number of ejection orifices, n=30, while the second recording head 2502 2002 has 12 ejection orifices (12 nozzles), where the number of ejection orifices, n=12. Like in the above-mentioned embodiments, black circles in FIG. 25 represent ejection orifices to be used for ejecting ink in the recording operation.

In the recording method of the embodiment, 12 ejection orifices, n19 to n30 shown at (1) of FIG. 25, or n16 to n27 shown at (2) of FIG. 25 are used for ejecting the black ink from the first recording head 2501. On the other hand, all the 12 ejection orifices n1 to n12 are used for ejecting the color ink from the second recording head 2502 shown in FIG. 25. With positional relation between the recording heads, all the ejection orifices (nozzles) are aligned according to the ejection orifice numbers in the sub-scan direction (indicated with the arrow y in the drawing). On the other hand, the recording heads are placed with a predetermined space from each other in the main scan direction (indicated with the arrow x in the drawing). Like in the first embodiment, the configuration of the firs recording head 2501 for black ink and the second recording head 2502 for color ink is not limited to a separate type for forming both heads separately from each other. The recording heads may be replaced with a single recording head, which is provided with both an ejection orifice row for black ink and an ejection orifice row for color ink. The ejection orifices may also be arranged in a zigzag manner, rather than being aligned in one row. Further, the number of ejection orifices of the second recording head 2502 may be the same as that of the first recording head 2501. The inks used in this embodiment is the same as those used in the first embodiment.

A point in which this embodiment differs from the other embodiments is that two different kinds of amounts of conveyance of the recording medium in the sub-scan direction are provided.

Referring next to FIGS. 26, 27, 28 and 29, a reciprocating recording method according to the fourth embodiment of the present invention will be described.

Figure 26:
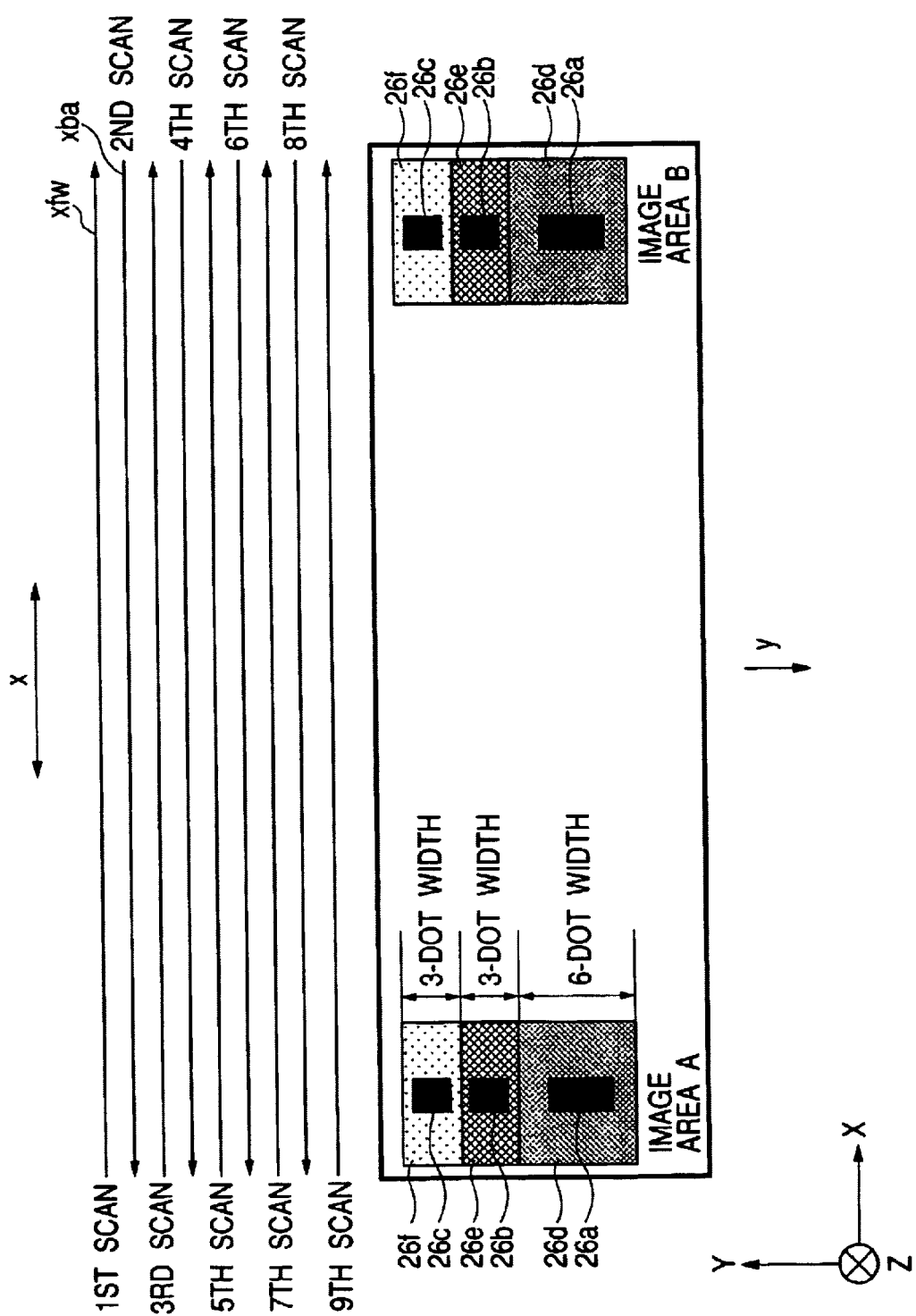
FIG. 26 is a view showing positions of recording image areas according to the fourth embodiment of the present invention.

FIG. 26 shows image areas to be completed by the recording method according to the embodiment. In FIG. 26, image areas A and B are located in both end parts of an A4-size recording medium along the main scan direction (indicated with the arrow x in the drawing).

Figure 28:
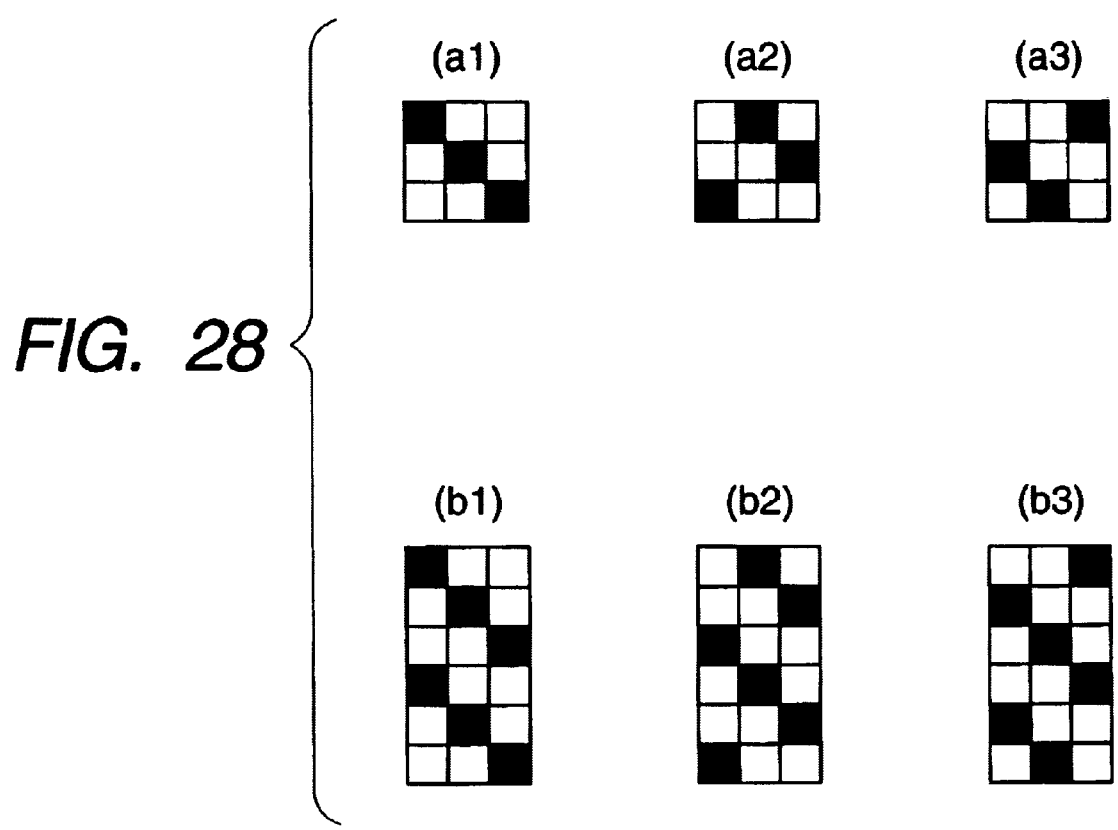
FIG. 28 is a view showing thinning-out patterns according to the fourth embodiment of the present invention.
Figure 29:
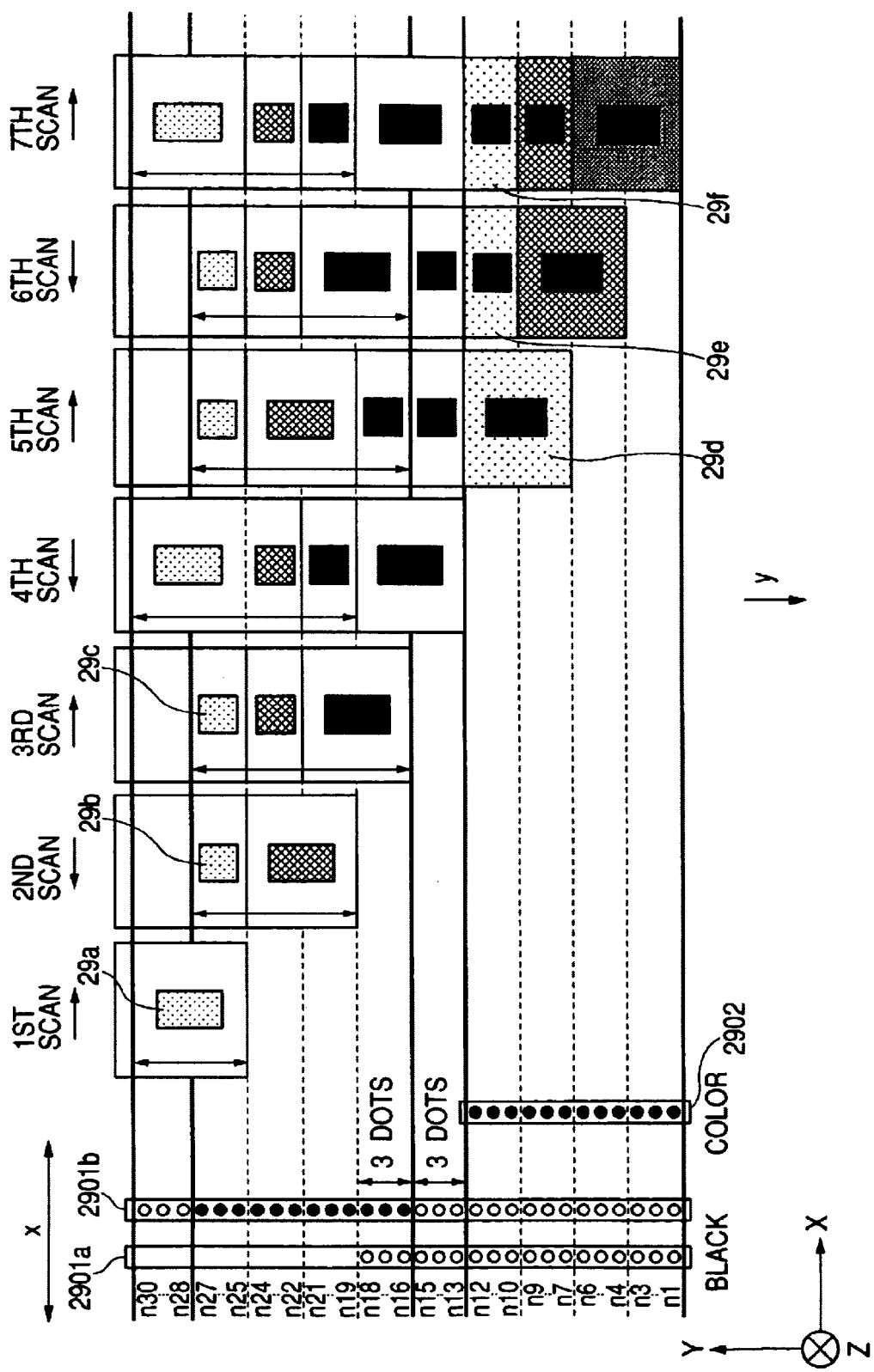
FIG. 29 is a view explaining a recording method according to the fourth embodiment of the present invention.

FIG. 27 is a table showing time differences between main scans for completing each image area in the embodiment. FIG. 28 is a diagram showing three kinds of thinning-out patterns to be complementary to one another in the case the number of ejection orifices is three and six, respectively. Like in the above-mentioned embodiments, the inside of each grid corresponds to the position of each dot to be recorded, and the blackened grids indicate positions at which ink is ejected to record dots. The other grids that are not painted out or blackened indicate thinned-out positions on which dots are not recorded. FIG. 29 is a diagram for explaining images to be recorded at each scan in the areas A and B.

At first, the first recording head 2501 for black ink is scanned at the first scan shown in FIG. 29. At the first scan, 12 nozzles n19 to n30 out of the 30 nozzles n1 to n30 to be used for ejecting black ink from the first recording head are used as indicated with 2901a in FIG. 29 and 2501 at (1) of FIG. 25. Of the nozzles n19 to n30, six nozzles n25 to n30 are used to eject the black ink according to a thinning-out pattern shown at (b1) of FIG. 28. As a result, a part 26a of the image area A and a part 26a of the image area B shown in FIG. 26 are recorded in this order in the thinning-out pattern (b1) of FIG. 28. In this case, the parts 26a of the image areas A and B correspond to a black data area 29a in FIG. 29.

Then, the recording medium is conveyed over a distance of six dots/600 dpi in the sub-scan direction. After that, the recording head is scanned at the second in the direction (indicated with the arrow xba in FIG. 26) opposite to that of the fist scan. At the second scan, 12 nozzles n16 to n27 out of the 30 nozzles n1 to n30 to be used in the recording head for black ink are used as indicated with 2901*b* in FIG. 29 and 2501 at (2) of FIG. 25. Of all the 12 nozzles n16 to n27, six nozzles n19 to n24 are used to eject the black ink according to a thinning-out pattern shown at (b2) of FIG. 28. As a result, the part 26*a* of the image area B and the part 26*a* of the image area A shown in FIG. 26 are recorded in this order in the thinning-out pattern (b2) of FIG. 28. In this case, the parts 26*a* of the image areas B and A correspond to the black data area 29*a* in FIG. 29. On the other hand, three nozzles n25 to n27 are used to eject the black ink according to a thinning-out pattern show at (a1) of FIG. 28. As a result, a part 26*b* of the image area B and a part 26*b* of the image area A shown in FIG. 26 are recorded in this order in the thinning-out pattern (a1) of FIG. 28. In this case, the parts 26*b* of the image area B and A correspond to a black data area 29*b* in FIG. 29. A time difference T1 between the first and second scans for recording the image area A is 0.35 sec, while a time difference T2 between the first and second scans for recording the image area B is 0.15 sec.

Then, the recording medium is conveyed over a distance of three dots/600 dpi. After that, the recording head is scanned at the third scan in the same direction as that of the first scan (the direction of the arrow xfw in FIG. 26). At the third scan, 12 nozzles n16 to n27 out of the 30 nozzles to be used in the recording head are used as indicated with 2901*b* in FIG. 29 and 2501 at (2) of FIG. 25. Of the 12 nozzles, six nozzles n16 to n21 are used to eject the black ink according to a thinning-out pattern shown at (b3) of FIG. 28. As a result, the part 26*a* of the image area A and the part 26*a* of the image area B shown in FIG. 26 are recorded in this order in the thinning-out pattern (b3) of FIG. 28 to complete image formation on the parts 26*a* corresponding to the black image area 29*a* in FIG. 29. On the other hand, three nozzles n22 to n24 are used to eject the black ink according to a thinning-out pattern show at (a2) of FIG. 28. As a result, the part 26*b* of the image area A and the part 26*b* of the image area B shown in FIG. 26 are recorded in this order in the thinning-out pattern (a2) of FIG. 28. In this case, the parts 26*b* of the image area B and A correspond to a black data area 29*b* in FIG. 29. Further, the remaining three nozzles n25 to n27 are used to eject the black ink according to the thinning-out pattern shown at (a1) of FIG. 28. As a result, a part 26*c* of the image area A and a part 26*c* of the image area B shown in FIG. 26 are recorded in this order in the thinning-out pattern (a1) of FIG. 28. In this case, the parts 26*c* of the image areas A and B correspond to a black data area 29*c* in FIG. 29. A time difference T2 between the second and third scans for recording the image area A is 0.15 sec, while a time difference T1 between the second and third scans for recording the image area B is 0.35 sec.

Further, the recording medium is conveyed over the distance of three dots/600 dpi. Then the recording head for black ink is scanned at the fourth scan in the same direction as that of the second scan. At the fourth scan, the 12 nozzles n19 to n30 out of the 30 nozzles to be used in the recording head for black ink are used as indicated with 2901*a* in FIG. 29 and 2501 at (1) of FIG. 25. Of the 12 nozzles, three nozzles n19 to n21 are used to eject the black ink according to a thinning-out pattern shown at (a3) of FIG. 28. As a result, the part 26*b* of the image area B and the part 26*b* of the image area A shown in n FIG. 26 are recorded in this order in the thinning-out pattern (a3) of FIG. 28. In this case, the image formation on the parts 26*b* corresponding to the black image area 29*b* in FIG. 29 is completed. On the other hand, three nozzles n22 to n24 are used to eject the black ink according to the thinning-out pattern (a2) of FIG. 28. As a result, the part 26*c* of the image area B and the part 26*c* of the image area A shown in FIG. 26 are recorded in this order in the thinning-out pattern (a2) of FIG. 28. In this case, the parts 26*c* of the image areas A and B correspond to the black data area 29*c* in FIG. 29. At the fourth scan, recording of the black data area 29*a* in FIG. 29 is not performed because it has already been completed. A time difference T1 between the third and fourth scans for recording the image area A is 0.35 sec. while a time difference T2 between the third and fourth scans for recording the image area B is 0.15 sec.

Further the recording medium is conveyed over the distance of six dots/600 dpi. Then the recording heads are scanned at the fifth scan in the same direction as that of the first scan. At the fifth scan, the 12 nozzles n16 to n27 are used in the recording head for black ink as indicated with 2901*b* in FIG. 29 and 2501 at (2) of FIG. 25. On the other hand, all the 12 nozzles are used in the recording head for color ink as indicated with 2902 in FIG. 29 and 2502 in FIG. 25. Of the 12 nozzles to be used for ejecting the black ink, three nozzles n16 to n18 are used to eject the black ink according to the thinning-out pattern (a3) of FIG. 28. As a result, the part 26*c* of the image area A and the part 26*c* of the image area B shown in FIG. 26 are recorded in this order in the thinning-out pattern (a3) to complete image formation on the parts 26*c* corresponding to the black data area 29*c* in FIG. 29. At the fifth scan, recording of the black data area 29*b* in FIG. 29 is not performed because it has already been completed at the last scan. On the other hand, six nozzles n7 to n12 out of the 12 nozzles to be used in the recording head for color ink are used to eject the color ink in the thinning-out pattern (b1) of FIG. 28. As a result, a part 26*d* of the image area A and a part 26*d* of the image area B shown in FIG. 26 are recorded in this order in the thinning-out pattern (b1) of FIG. 28. In this case, the parts 26*d* of the image areas A and B correspond to a color data area 29*d* in FIG. 29. A time difference T2 between the fourth and fifth scans for recording the image area A is 0.15 sec, while a time difference T1 between the fourth and fifth scans for recording the image area B is 0.35 sec.

Further, the recording medium is conveyed over the distance of three dots/600 dpi. Then the recording head for color ink is scanned at the sixth scan in the same direction as that of the second scan. At the six scan, the recording head for black ink does not perform recording because it has already completed image formation on the black data area 29*c* in FIG. 29. On the other hand, six nozzles n4 to n9 out of the 12 nozzles to be used in the recording head for color ink (indicated with 2902 in FIG. 29 and 2505 in FIG. 25) are used to eject the color ink according to the thinning-out pattern (b2) of FIG. 28. As a result, the part 26*d* of the image area B and the part 26*d* of the image area A shown in FIG. 26 are recorded in this order in the thinning-out pattern. In this case, the parts 26*d* of the image areas B and A correspond to the color data area 29*d* in FIG. 29. Further, three nozzles n10 to n12 are used to eject the color ink according to the thinning-out pattern (a1) of FIG. 28. As a result, a part 26*e* of the image area B and a part 26*e* of the image area A shown in FIG. 26 are recorded in this order in the thinning-out pattern (a1) of FIG. 28. The parts 26*e* of the image areas B and A correspond to a color data area 29*e* in FIG. 29. A time difference T1 between the firth and sixth scans for recording the image area A is 0.35 sec, while a time difference T2 between the fifth and sixth scans for recording the image area B is 0.15 sec.

Further the recording medium is conveyed over the distance of three dots/600 dpi. Here, only the recording head for color ink is scanned at the seventh scan in the same direction as that of the first scan, because all the recording areas corresponding to the black images have already been completed. At the seventh scan, six nozzles n1 to n6 out of the 12 nozzles to be used in the recording head for color ink are used to eject the color ink according to the thinning-out pattern (b3) of FIG. 28. As a result, the part 26d of the image area A and the part 26d of the image area B shown in FIG. 26 are recorded in this order in the thinning-out pattern (b3) of FIG. 28. Thus the image formation is completed on the parts 26d corresponding to the color data area 29d in FIG. 29. On the other hand, three nozzles n7 to n9 are used to eject the color ink according to the thinning-out pattern (a2) of FIG. 28. As a result, the part 26e of the image area A and the part 26e of the image area B shown in FIG. 26 are recorded in this order in the thinning-out pattern (a2) of FIG. 28. In this case, the parts 26e of the image areas A and B correspond to the color image area 29e in FIG. 29. After that, the remaining three nozzles n10 to n12 are used to eject the color ink according to the thinning-out pattern (a1) of FIG. 28. As a result, a part 26f of the image area A and a part 26f of the image area B shown in FIG. 26 are recorded in this order in the thinning-out pattern (a1) of FIG. 28. In this case, the parts 26f of the image areas A and B correspond to a color image area 29f in FIG. 29. A time difference T2 between the six and seventh scans for recording the image area A is 0.15 sec, while a time difference T1 between the six and seventh scans for recording the image area B is 0.35 sec.

Further, the recording medium is conveyed over the distance of six dots/600 dpi. The recording head for color ink is scanned at the eighth scan, (not shown) in the same direction as that of the second scan. At the eighth scan, three nozzles n1 to n3 out of the 12 nozzles to be used in the recording head for color ink are used to eject the color ink according to the thinning pattern (a3) of FIG. 28. As a result, the part 26e of the image area B and the part 26e of the image area A shown in FIG. 26 are recorded in this order in the thinning-out pattern (a3) to complete image formation on the parts 26e corresponding to the color data area 29e in FIG. 29. On the other hand, three nozzles n4 to n6 are used to eject the color ink according to the thinning-out pattern (a2) of FIG. 28. As a result, the part 26f of the image area B and the part 26f of the image area A shown in FIG. 26 are recorded in this order in the thinning-out pattern (a2) of FIG. 28. A time difference T1 between the seventh and eighth scans for recording the image area A is 0.35 sec, while a time difference T2 between the seventh and eighth scans for recording the image area B is 0.15 sec.

Further, the recording medium is conveyed over the distance of three dots/600 dpi. After that, the recording head for color ink is scanned at the ninth scan, not shown, in the same direction as that of the first scan. At the ninth scan, three nozzles n1 to n3 out of the 12 nozzles to be used in the recording head for color ink are used to eject the color ink in the thinning-out pattern (a3) of FIG. 28. As a result, the part 29f of the image area A and the part 26f of the image area B shown in FIG. 26 are recorded in this order in the thinning-out pattern (a3) of FIG. 28 to complete image formation on the parts 26f corresponding to the color data area 29f in FIG. 29. A time difference T2 between the eighth and ninth scans for recording the image area A is 0.15 sec, while a time difference T1 between the eighth and ninth scans for recording the image area B is 0.35 sec.

As above-mentioned, the number of times of record scans in the main scan direction to make each of the first and second recording head rows complete image formation is three, and the amount of conveyance in the sub-scan direction of the recording medium at each scan has two, three dots/600 dpi and six dots/600 dpi. In this case, the number of times of record scans to make the first recording head row for discharging black ink complete image formation, m=3, and the number of times of record scans to make the second recording head row for discharging color ink complete image formation, n=3, so such a value a as to make (m+a) an even number is one (a=1), (m+a)=(3+1)=four. As a result, the total amounts of conveyance of the recording medium continuously performed four times are (6+3+3+6) dots/600 dpi, that is, 18 dots/600 dpi, and (3+3+6+3) dots/600 dpi or (3+6+3+3) dots/600 dpi, that is, 15 dots/600 dpi. In other words, the position of the top of the ejection orifices in the second ejection orifice row for ejecting the color ink, to be used from the paper feed side from which the recording medium is fed is spaced 18 dots/600 dpi or 15 dots/600 dpi away from the first ejection orifice row for ejecting the black ink, as indicated with 2501 at (1) of FIG. 25 and 2901a in FIG. 29, or 2501 at (2) of FIG. 25 and 2901b in FIG. 29. In the embodiment, a time difference between recording of the part 26a and the part 26d of the image area A in FIG. 26 during the interval between the time black recording is started at the first scan and color recording is started at the fifth scan is determined from FIG. 27 as T1+T2+T1+T2=1.0 sec. On the other hand, a time difference between the part 26a and the part 26d of the image area B is also determined from FIG. 27 as T2+T1+T2+T1=1.0 sec. Thus the time differences in recording the parts 26a and 26d between the image area A and the image area B are made equal to each other. A time difference between recording of the part 26b and the part 26e of the image area A in FIG. 26 during the interval between the time black recording is started at the second scan and color recording is started at the sixth scan is determined from FIG. 27 as T2+T1+T2+T1=1.0 sec. On the other hand, a time difference between the part 26b and the part 26e of the image area B is also determined from FIG. 27 as T1+T2+T1+T1=1.0 sec. Thus the time differences in recording the parts 26b and 26e between the image area A and the image area B are made equal to each other. A time difference between recording of the part 26c and the part 26f of the image area A in FIG. 26 during the interval between the time black recording is started at the third scan and color recording is started at the seventh scan is determined from FIG. 27 as T1+T2+T1+T2=1.0 sec. On the other hand, a time difference between the part 26c and the part 26f of the image area B is also determined from FIG. 27 as T2+T1+T2+T1=1.0 sec. Thus the time differences in recording the parts 26c and 26f between the image area A and the image area B are made equal to each other. In other words, the time differences are all made equal to one another, which makes it possible to prevent color shading.

Further, in the embodiment, the recording method is performed in the combination of the two kinds of amounts of conveyance of the recording medium at each scan, which is also effective in preventing bleeding between colors (between black and color).

Figure 30:
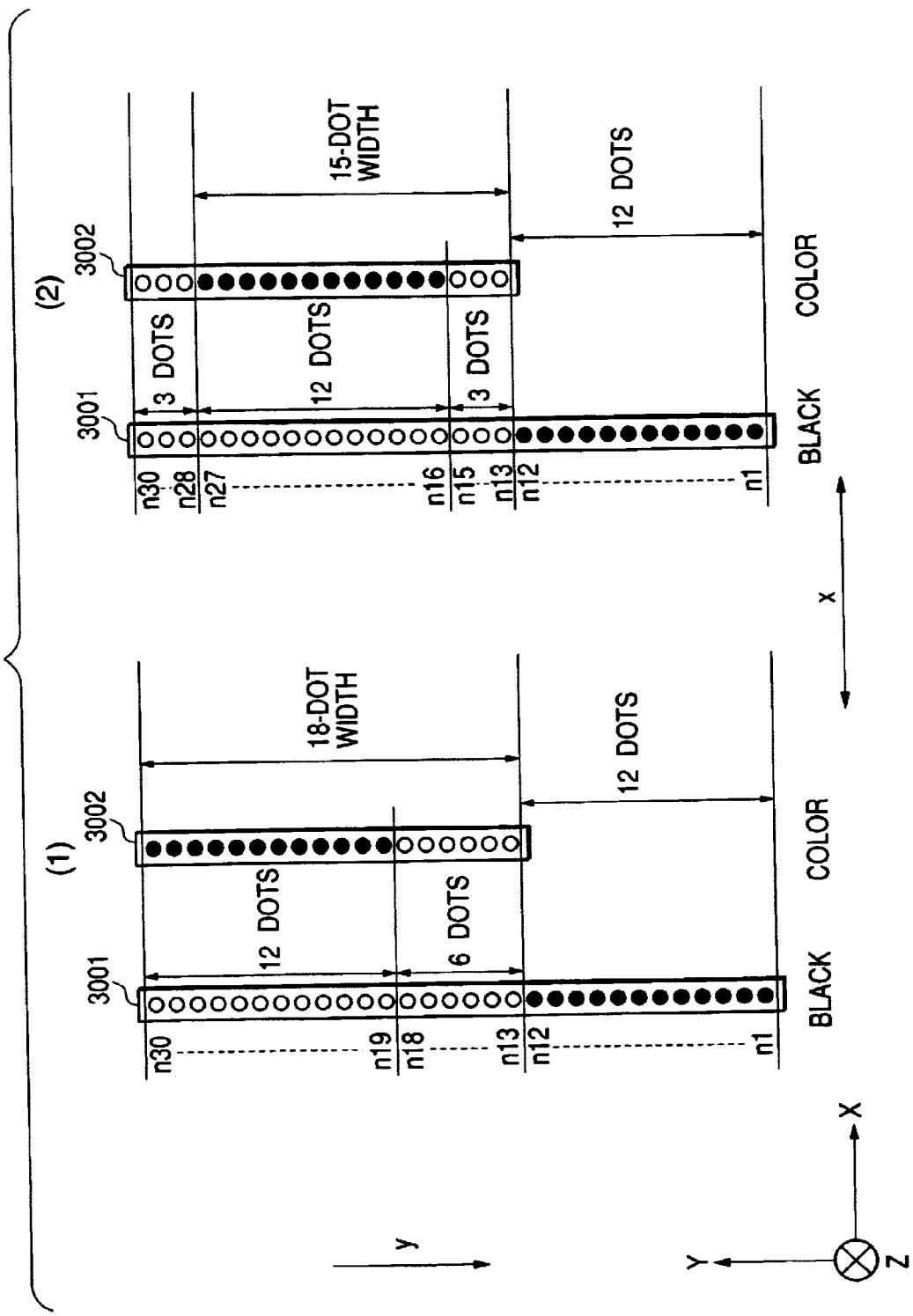
FIG. 30 is a view another configuration of recording heads applicable to the fourth embodiment of the present invention.

It should be noted that in the embodiment the recording heads were configured as shown in FIG. 25, but they may also be configured as shown in FIG. 30. In other words, a first recording head 3001 for black ink and a second recording head 3002 for color ink are arranged as shown in FIG. 30 so that the color images will be recorded prior to the black images. Like in the above-mentioned embodiments, the first recording head 3001 for black ink has 30 ejection orifices (30 nozzles) at the density of 600 dpi. In the configuration shown in FIG. 30, 12 ejection orifices n1 to n12 are used to eject a black ink. On the other hand, the recording head 3002 for color ink has 18 ejection orifices (18 nozzles) at the density of 600 dpi. Of the 18 ejection orifices, 12 ejection orifices n19 to n30 as shown at (1) of FIG. 30, and 12 ejection orifices n16 to n27 as shown at (2) of FIG. 30 are used by switching from one to another according to the record scan.

It should be noted that in the embodiment the thinning-out patterns are fixed patterns, but the thinning-out patterns may be random thinning-out patterns so that they will not synchronize with patterns of image data.

In the embodiment, the above-mentioned control is performed, which makes it possible to provide an ink jet recording apparatus capable of recording high-quality images using the reciprocating recording method provided with two or more kinds of amounts of conveyance of the recording medium so that color shading and bleeding between colors inherent in the reciprocating recording method will be prevented.

As described above and according to the present invention, not only color shading caused in the reciprocating recording operation is prevented, but also bleeding between colors inherent in the multi-pass recording method is reduced, which makes it possible to achieve high-quality image recording.

What is claimed is:

1. An ink jet recording apparatus for performing image recording by ejecting ink on a recording medium from ejection orifices of recording means having a first ejection orifice row and a second ejection orifice row, each of which has a plurality of ejection orifices arranged thereon for ejecting the ink therefrom, said apparatus comprising:

main scanning means for moving the recording means relative to the recording medium in a main scan direction opposite to the direction in which the rows of ejection orifices are aligned;

sub-scanning means for sub-scanning the recording medium along a sub-scan direction from the upstream side to the downstream side; and recording control means for controlling recording of images on the recording medium by repeating recording operation of said main scanning means performing recording by ejecting the ink from the recording means during scanning of the recording means, and sub-scanning operation of said sub-scanning means, wherein when the number of times of record scans in the main scan direction to make the first ejection orifice row complete image formation is set to m (where m is a positive integer), the number of times of record scans in the main scan direction to make the second ejection orifice row complete image formation is set to n (where n is a positive integer), and the amount of sub-scanning of the recording medium performed by the sub-scanning means every main scan is set to L (where L is a positive number), said recording control means controls the position of the top of the ejection orifices in the second ejection orifice row, to be used from the upstream side of the sub-scan direction to be spaced a length of $(m+a) \times L$ apart from the first ejection orifice row to the downstream side of the subscan direction, and the value of a to make $(m+a)$ an even number.

2. The apparatus according to claim 1, wherein the width of recording performed along the sub-scan direction every main scan to make the first ejection orifice row complete image formation is set equal to the width of recording performed along the sub-scanning direction every main scan to make the second ejection orifice row complete image formation.

3. The apparatus according to claim 1, wherein the width of recording performed along the sub-scan direction every main scan to make the first ejection orifice row complete image formation is made different from the width of recording performed along the subscanning direction every main scan to make the second ejection orifice row complete image formation.

4. The apparatus according to claim 3, wherein the width of recording performed along the sub-scan direction every main scan to make the first ejection orifice row complete image formation is set smaller than the width of recording performed along the subscanning direction every main scan to make the second ejection orifice row complete image formation.

5. The apparatus according to claim 1, wherein the length of the first ejection orifice row in which a plurality of ejection orifices are aligned is made different from the length of the first ejection orifice row in which a plurality of ejection orifices are aligned.

6. The apparatus according to claim 5, wherein the length of the first ejection orifice row in which a plurality of ejection orifices are aligned is made longer than the length of the first ejection orifice row in which a plurality of ejection orifices are aligned.

7. The apparatus according to claim 1, wherein image recording performed with either the first ejection orifice row or the second ejection orifice at plural times of main scans is controlled by thinning out an image to be recorded at each main scan.

8. The apparatus according to claim 1, wherein Ka value, measured by the Bristow tester, of the ink to be ejected from the first ejection orifice row is smaller than that of the ink to be ejected from the second ejection orifice row.

9. The apparatus according to claim 1, wherein the first ejection orifice row ejects a black ink.

10. The apparatus according to claim 1, wherein the second ejection orifice row ejects a color ink.

11. The apparatus according to claim 10, wherein the color ink is any of cyan, magenta or yellow.

12. The apparatus according to claim 1, wherein the recording means is equipped with an electrothermal transducer for applying thermal energy to ink so that a bubble will be formed in the ink, thereby ejecting the ink from each ejection orifice.

13. An ink jet recording apparatus for performing recording by ejecting ink on a recording medium from ejection orifices of recording means having a first ejection orifice row and a second ejection orifice row, each of which has a plurality of ejection orifices arranged thereon for ejecting the ink therefrom, said apparatus comprising:

main scanning means for moving the recording means relative to the recording medium in a main scan direction opposite to the direction in which the rows of ejection orifices are aligned;

sub-scanning means for sub-scanning the recording medium along a sub-scan direction from the upstream side to the downstream side; and recording control means for controlling recording of images on the recording medium by repeating recording operation of said main scanning means performing recording by ejecting the ink from the recording means during scanning of the recording means, and sub-scanning operation of said sub-scanning means, wherein when the number of times of record scans in the main scan direction to make the first ejection orifice row complete image formation is set to m (where m is a positive integer), the number of times of record scans in the main scan direction to make the second ejection orifice row complete image formation is set to n (where n is a positive integer), and the amount of conveyance of the recording medium performed in the sub-scan direction every main scan is set to L (where L is a positive number), said recording control means controls the position of the top of the ejection orifices in the second ejection orifice row, to be used from the downstream side of the sub-scan direction to be spaced a length of (m+a)×L apart from the first ejection orifice row in the sub-scan direction, and the value of a to make (n+a) an even number.

14. The apparatus according to claim 13, wherein the length of the first ejection orifice row in which a plurality of ejection orifices are aligned is set equal to the length of the first ejection orifice row in which a plurality of ejection orifices are aligned.

15. An ink jet recording apparatus for performing recording by ejecting ink on a recording medium from ejection orifices of recording means having a first ejection orifice row and a second ejection orifice row, each of which has a plurality of ejection orifices arranged thereon for ejecting the ink therefrom, said apparatus comprising:

main scanning means for moving the recording means relative to the recording medium in a main scan direction opposite to the direction in which the rows of ejection orifices are aligned;

sub-scanning means for sub-scanning the recording medium along a sub-scan direction from the upstream side to the downstream side; and recording control means for controlling recording of images on the recording medium by repeating recording operation of said main scanning means performing recording by ejecting the ink from the recording means during scanning of the recording means, and sub-scanning operation of said sub-scanning means, wherein when the number of times of record scans in the main scan direction to make the first ejection orifice row complete image formation is set to m (where m is a positive integer), and the number of times of record scans in the main scan direction to make the second ejection orifice row complete image formation is set to n (where n is a positive integer), said recording control means uses at least two kinds of amounts of sub-scanning of the recording medium performed in the sub-scan direction every main scan to control, relative to the first ejection orifice row, the position of the top of the ejection orifices in the second ejection orifice row to be used from the upstream side of the sub-scanning performed by said sub-scanning means, to be equivalent to total amounts of conveyance of the recording medium continuously performed (m+a) times using the at least two kinds of amounts of sub-scanning, and the value of a to make (m+a) an even number.

16. An ink jet recording apparatus for performing recording by ejecting ink on a recording medium from ejection orifices of recording means having a first ejection orifice row and a second ejection orifice row, each of which has a plurality of ejection orifices arranged thereon for ejecting the ink therefrom, said apparatus comprising:

main scanning means for moving the recording means relative to the recording medium in a main scan direction opposite to the direction in which the rows of ejection orifices are aligned;

sub-scanning means for sub-scanning the recording medium along a sub-scan direction from the upstream side to the downstream side; and recording control means for controlling recording of images on the recording medium by repeating recording operation of said main scanning means performing recording by ejecting the ink from the recording means during scanning of the recording means, and sub-scanning operation of said sub-scanning means, wherein when the number of times of record scans in the main scan direction to make the first ejection orifice row complete image formation is set to m (where m is a positive integer), and the number of times of record scans in the main scan direction to make the second ejection orifice row complete image formation is set to n (where n is a positive integer), said recording control means uses at least two kinds of amounts of sub-scanning performed by said sub-scan means every main scan to control, relative to the first ejection orifice row, the position of the top of the ejection orifices in the second ejection orifice row to be used from the downstream side of the sub-scanning, to be equivalent to total amounts of sub-scanning performed continuously (m+a) times (where a is a positive integer) using the at least two kinds of amounts of sub-scanning, and the value of a to make (n+a) an even number.

17. An ink jet recording method for an ink jet recording apparatus designed to perform image recording by ejecting ink on a recording medium from ejection orifices of recording means having a first ejection orifice row and a second ejection orifice row, each of which has a plurality of ejection orifices arranged thereon for ejecting the ink therefrom, the apparatus including, main scanning means for moving the recording means relative to the recording medium in a main scan direction opposite to the direction in which the rows of ejection orifices are aligned, sub-scanning means for sub-scanning the recording medium along a sub-scan direction from the upstream side to the downstream side, and recording control means for controlling recording of images on the recording medium by repeating recording operation of the main scanning means performing recording by ejecting the ink from the recording means during scanning of the recording means, and sub-scanning operation of the sub-scanning means, said method comprising the steps of:

setting the number of times of record scans in the main scan direction to make the first ejection orifice row complete image formation to m (where m is a positive integer), the number of times of record scans in the main scan direction to make the second ejection orifice row complete image formation to n (where n is a positive integer), and the amount of sub-scanning of the recording medium performed by the sub-scanning means every main scan to L (where L is a positive number);

spacing the position of the top of the ejection orifices in the second ejection orifice row, to be used from the upstream side of the sub-scan direction, a length of (m+a)×L apart from the first ejection orifice row to the downstream side of the sub-scan direction; and controlling the value of a to make (m+a) an even number.

18. An ink jet recording method for an ink jet recording apparatus designed to perform image recording by ejecting ink on a recording medium from ejection orifices of recording means having a first ejection orifice row and a second ejection orifice row, each of which has a plurality of ejection orifices arranged thereon for ejecting the ink therefrom, the apparatus including, main scanning means for moving the recording means relative to the recording medium in a main scan direction opposite to the direction in which the rows of ejection orifices are aligned, sub-scanning means for sub-scanning the recording medium along a sub-scan direction from the upstream side to the downstream side, and recording control means for controlling recording of images on the recording medium by repeating recording operation of the main scanning means performing recording by ejecting the ink from the recording means during scanning of the recording means, and sub-scanning operation of the sub-scanning means, said method comprising the steps of:

setting the number of times of record scans in the main scan direction to make the first ejection orifice row complete image formation to m (where m is a positive integer), the number of times of record scans in the main scan direction to make the second ejection orifice row complete image formation to n (where n is a positive integer), and the amount of conveyance of the recording medium performed in the sub-scan direction every main scan to L (where L is a positive number);

spacing the position of the top of the ejection orifices in the second ejection orifice row, to be used from the downstream side of the sub-scan direction, a length of (m+a)×L apart from the first ejection orifice row in the sub-scan direction; and controlling the value of a to make (n+a) an even number.

19. An ink jet recording method for an ink jet recording apparatus designed to perform image recording by ejecting ink on a recording medium from ejection orifices of recording means having a first ejection orifice row and a second ejection orifice row, each of which has a plurality of ejection orifices arranged thereon for ejecting the ink therefrom, the apparatus including, main scanning means for moving the recording means relative to the recording medium in a main scan direction opposite to the direction in which the rows of ejection orifices are aligned, sub-scanning means for sub-scanning the recording medium along a sub-scan direction from the upstream side to the downstream side, and recording control means for controlling recording of images on the recording medium by repeating recording operation of the main scanning means performing recording by ejecting the ink from the recording means during scanning of the recording means, and sub-scanning operation of the sub-scanning means, said method comprising the steps of:

setting the number of times of record scans in the main scan direction to make the first ejection orifice row complete image formation to m (where m is a positive integer), and the number of times of record scans in the main scan direction to make the second ejection orifice row complete image formation to n (where n is a positive integer);

using at least two kinds of amounts of subscanning of the recording medium performed in the subscan direction every main scan to control, relative to the first ejection orifice row, the position of the top of the ejection orifices in the second ejection orifice row to be used from the upstream side of the subscanning performed by the sub-scanning means, to be equivalent to total amounts of conveyance of the recording medium continuously performed (m+a) times using the at least two kinds of amounts of subscanning; and controlling the value of a to make (m+a) an even number.

20. An ink jet recording method for an ink jet recording apparatus designed to perform image recording by ejecting ink on a recording medium from ejection orifices of recording means having a first ejection orifice row and a second ejection orifice row, each of which has a plurality of ejection orifices arranged thereon for ejecting the ink therefrom, the apparatus including, main scanning means for moving the recording means relative to the recording medium in a main scan direction opposite to the direction in which the rows of ejection orifices are aligned, sub-scanning means for sub-scanning the recording medium along a sub-scan direction from the upstream side to the downstream side, and recording control means for controlling recording of images on the recording medium by repeating recording operation of the main scanning means performing recording by ejecting the ink from the recording means during scanning of the recording means, and sub-scanning operation of the sub-scanning means, said method comprising the steps of:

setting the number of times of record scans in the main scan direction to make the first ejection orifice row complete image formation to m (where m is a positive integer), and the number of times of record scans in the main scan direction to make the second ejection orifice row complete image formation to n (where n is a positive integer);

using at least two kinds of amounts of sub-scanning performed by said sub-scan means every main scan to control, relative to the first ejection orifice row, the position of the top of the ejection orifices in the second ejection orifice row to be used from the downstream side of the sub-scanning, to be equivalent to total amounts of sub-scanning performed continuously (m+a) times (where a is a positive integer) using the at least two kinds of amounts of sub-scanning; and controlling the value of a to make (n+a) an even number.

* * * * *

UNITED STATES PATENT AND TRADEMARK OFFICE
CERTIFICATE OF CORRECTION

PATENT NO. : 6,688,716 B2
DATED : February 10, 2004
INVENTOR(S) : Hidehiko Kanda et al.

It is certified that error appears in the above-identified patent and that said Letters Patent is hereby corrected as shown below:

Column 1,
Line 22, "thermal," should read -- thermal --; and
Line 43, "above" should read -- as above --.

Column 2,
Line 27, "is" should read -- as --;
Line 56, "occurs" should read -- occur --; and
Line 62, "cause" should read -- case --.

Column 3,
Line 13, "fist," should read -- first, --.

Column 4,
Line 55, "overlapped or" should read -- overlapped on or --.

Column 10,
Line 21, "FIGS. 9, through 11" should read -- FIGS. 9 through 11 --; and
Line 58, "can generically" should read -- can be generically --.

Column 13,
Line 24, "is" should read -- are --.

Column 17,
Line 20, "is" should read -- are --.

Column 20,
Line 1, "2002" should be deleted.
Line 18, "firs" should read -- first --; and
Line 28, "is" should read -- are --.

Column 21,
Line 5, "fist" should read -- first --; and
Line 41, "show" should read -- shown --.

UNITED STATES PATENT AND TRADEMARK OFFICE
CERTIFICATE OF CORRECTION

PATENT NO. : 6,688,716 B2
DATED : February 10, 2004
INVENTOR(S) : Hidehiko Kanda et al.

It is certified that error appears in the above-identified patent and that said Letters Patent is hereby corrected as shown below:

Column 22,
Line 48, "six" should read -- sixth --; and
Line 66, "firth" should read -- fifth --.

Signed and Sealed this

Third Day of August, 2004

JON W. DUDAS
*Acting Director of the United States Patent and Trademark Office*